(12) United States Patent
Bast et al.

(10) Patent No.: US 8,417,409 B2
(45) Date of Patent: Apr. 9, 2013

(54) TRANSIT ROUTING SYSTEM FOR PUBLIC TRANSPORTATION TRIP PLANNING

(75) Inventors: Hannah Bast, Freiburg (DE); Erik Carlsson, Zurich (CH); Arno Eigenwillig, Zurich (CH); Robert Geisberger, Karlsruhe (DE); Chris Harrelson, Berkeley, CA (US); Veselin Raychev, Zurich (CH); Fabien Viger, Zurich (CH)

(73) Assignee: Google Inc., Mountain View, CA (US)

( * ) Notice: Subject to any disclaimer, the term of this patent is extended or adjusted under 35 U.S.C. 154(b) by 376 days.

(21) Appl. No.: 12/752,980

(22) Filed: Apr. 1, 2010

(65) Prior Publication Data

US 2011/0112759 A1      May 12, 2011

Related U.S. Application Data

(60) Provisional application No. 61/260,342, filed on Nov. 11, 2009.

(51) Int. Cl.
*G01C 22/00*      (2006.01)

(52) U.S. Cl. .......................................................... 701/25
(58) Field of Classification Search .................. 701/202
See application file for complete search history.

(56) References Cited

U.S. PATENT DOCUMENTS

| 2003/0045999 A1* | 3/2003 | Joerg et al. ..................... 701/209 |
| 2008/0027772 A1* | 1/2008 | Gernega et al. ..................... 705/7 |
| 2008/0054072 A1 | 3/2008 | Katragadda et al. |

OTHER PUBLICATIONS

PCT International Search Report and Written Opinion, PCT/US2010/056316, Jan. 13, 2011, 13 Pages.

* cited by examiner

*Primary Examiner* — Thomas Tarcza
*Assistant Examiner* — Maceeh Anwari
(74) *Attorney, Agent, or Firm* — Fenwick & West LLP

(57) ABSTRACT

A public transit travel planning system and methodology that uses an extensive pre-processing approach of transit information prior to query time on order to determine optimal public transit routes for journeys. At query time, since the transit information has already been processed by the system, very little computation is needed in order to fulfill the query. The system then provides users with public transit directions in response to the queries for public transit journeys.

32 Claims, 21 Drawing Sheets

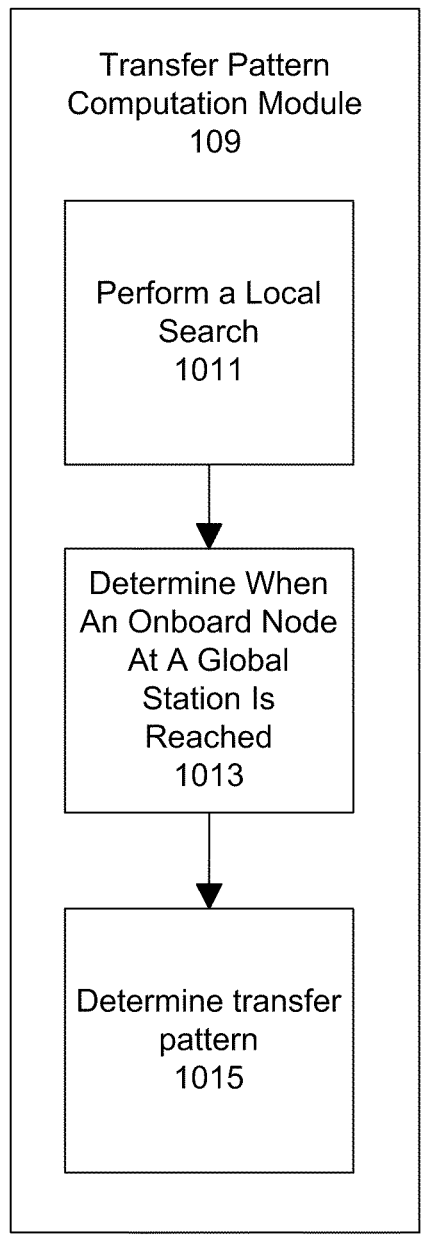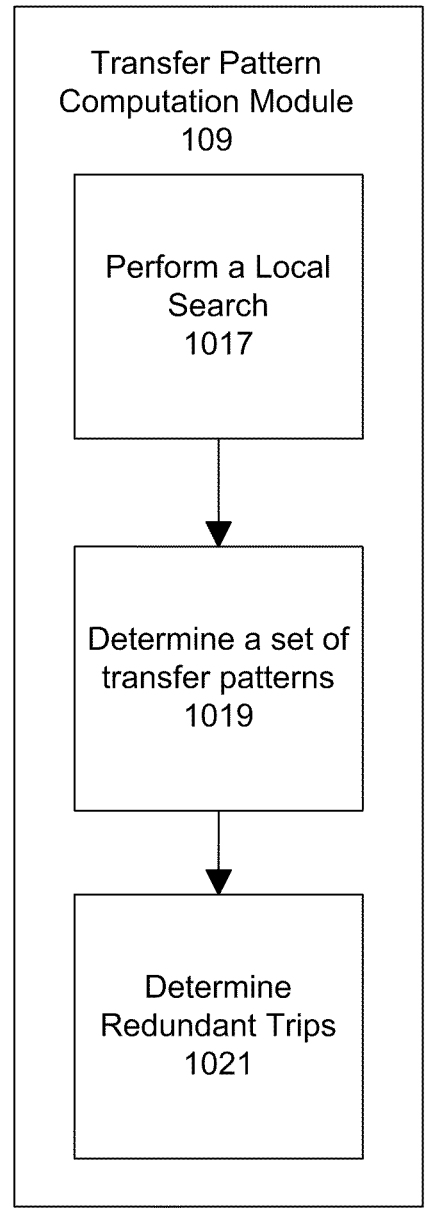
FIG. 10C
FIG. 10D

1900

1901

Get Directions  My Maps

⊠

Ⓐ 801 California St Mt View CA
Ⓑ 555 California Street, San Francisco, CA
Add Destination - Show options
By public transit ▾    Get Directions Also available: 🚗 By car

Transit directions to 555 California St, San Francisco, CA 94104

⊟ Suggested routes - Show options

1903

| 8:51am - 10:23am | 🚶 🚉 🚌 |
| 1 hour 32 mins | 🚶 |
| 9:21am - 10:56am | 🚶 🚉 🚍 |
| 1 hour 35 mins | 🚶 |
| 9:51am - 11:25am | 🚶 🚉 🚌 |
| 1 hour 34 mins | 🚶 |

📍 801 California St
   Mountain View, CA 94041

$7.50 (vs. $22.64 driving!)
Showing Trip 1    Travel time: about 1 hour 32 mins

🚶 Walk to Mountain View Caltrain
   About 8 mins        1907
   ⊞ Show details

1905

🚉 Train - Limited - 233 - Direction: Tamien to San Francisco
   Service run by Caltrain
   8:59am   Depart Mountain View Caltrain
            1 hour 3 mins
   10:02am  Arrive San Francisco Caltrain 🚌 Bus - 10 - Townsend - Direction: Van Ness & North Point
   7 mins to make transfer
   Service run by San Francisco Municipal Transportation Agency
   10:09am  Depart Townsend St & 4th St
            11 mins
   10:20am  Arrive Sansome St & California St 🚶 Walk to 555 California St
   About 4 mins
   ⊞ Show details

FIG. 19

TRANSIT ROUTING SYSTEM FOR PUBLIC TRANSPORTATION TRIP PLANNING

CROSS REFERENCE TO RELATED APPLICATIONS

This application claims the benefit of U.S. Provisional Application No. 61/260,342 filed Nov. 11, 2009, which is hereby incorporated herein by reference.

FIELD OF THE INVENTION

The present invention relates to public transportation trip planning and more specifically to minimizing computation time and resources needed to provide public transportation directions by using preprocessed transit information.

BACKGROUND OF THE INVENTION

With the improvement of the public transportation infrastructure, an increasing awareness of the environment, and the rising cost of gasoline, many people have begun using various forms of public transportation. Rather than using their own vehicles, people have increasingly used railway transportation, buses, and/or ferries for their travel needs. Because of this increase in use of public transportation, public transit planning systems have been developed. These systems provide users with directions to travel between a starting location to a destination location via various forms of public transportation.

Typically, in these systems, a query including a starting location and a destination is received, and the transit planning systems provide step by step directions to reach the destination using one or more forms of public transportation. For example, the directions can include a sequence of which public transit vehicles (e.g., buses, trains, etc.) are used and which stops at public transit locations need to be made in order to reach the destination of the trip. The directions may include a transfer to another transit vehicle required at the different transit locations along the trip. Thus, the planning systems provide a mechanism that offers information for people to easily plan their trips using public transportation.

Typically, to determine the directions for a trip, these conventional transit planning systems analyze, at query time, various routes between the starting and destination locations of the trip in order to determine the optimal path to reach the destination. This approach is useful when there are a relatively small number of potential routes between the locations due to a limited number of available transit options. However, due to the expansion of the public transportation infrastructure and the ability to transfer between different transportation systems (e.g., transfer between a train and bus at a common station), the number of possible routes between any given starting location and destination location has grown significantly. Thus, the time needed during query time to calculate the optimal path to reach a destination has also increased dramatically thereby increasing the time that users have to wait to receive results.

SUMMARY OF THE INVENTION

A public transit travel planning system and method is provided which uses pre-processed transit information prior to query time to determine optimal public transit routes in response to a query for a journey or trip using public transit. The optimal public transit routes describe the best routes for a trip relative to time and other factors using only public transportation and/or walking to reach a destination location from a given starting point. The public transit travel planning system processes transit information (which describes basic public transit schedules) prior to query time to determine optimal transfer patterns that describe routes between any two transit stations. More specifically, a transfer pattern describes a sequence of transit vehicle transfers at one or more transit stations that need to be made in order reach a destination. By pre-processing the transit information to determine the transfer patterns prior to query time, a minimal amount of computation at query time is needed in order to fulfill a user query for a public transit route. Generally, the system performs pre- and post-query computations in order to provide users with public transit routes.

Prior to query time, the system computes the optimal public transportation transfer patterns between known transit stations using transit information received from various transit agencies. Each stored transit trip described by the transit information includes a source station and a target station. A schedule of one or more stops (i.e., a route) at transit stations by a transit vehicle are retrieved from the each stored trip. A transit graph is generated that represents each stored trip's route as a series of nodes connected by arcs. Each node in the transit graph represents an event that occurs at a transit station that is made by a transit vehicle associated with the trip. Examples of the event include the transit vehicle arriving or departing the transit station. For each pair of transit stations represented in the transit graph, an optimal transfer pattern is calculated that describes the best transit route in terms of number of transfers, duration of trip and/or other factors. As mentioned previously, the optimal transfer pattern describes one or more transfers along transit stations between the pair of stations in the graph. Each optimal transfer pattern for each pair of transit stations is stored for later use during query time.

Once a query is received, the system uses the stored optimal transfer patterns to determine a public transit route between a given starting location and a target location that is included in the query. After receiving the query, the system determines the transit stations within a radial distance of the starting location to generate a source station list that describes the stations nearby the starting location. The system similarly determines transit stations within a radial distance of the target location to generate a target station list that describes the stations nearby the target location. For each pair wise combination of transit stations that describe a source station from the source station list and a target station from the target station list, a stored transfer pattern is retrieved that describes transit vehicle transfers at intermediate stations between the source station and the target station. Since the transfer patterns have already been computed prior to query time, the system need only retrieve the transfer patterns. The system then determines at least one optimal route from the source station to the target station based on the retrieved transfer patterns. The optimal route is then transmitted to the client device of the user who submitted the query.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIGS. 10A-10F illustrate process flow diagrams for heuristic transfer pattern computation using global stations according to one embodiment.

FIG. 19 illustrates an example user interface including optimal trips according to one embodiment.

Figure 1:
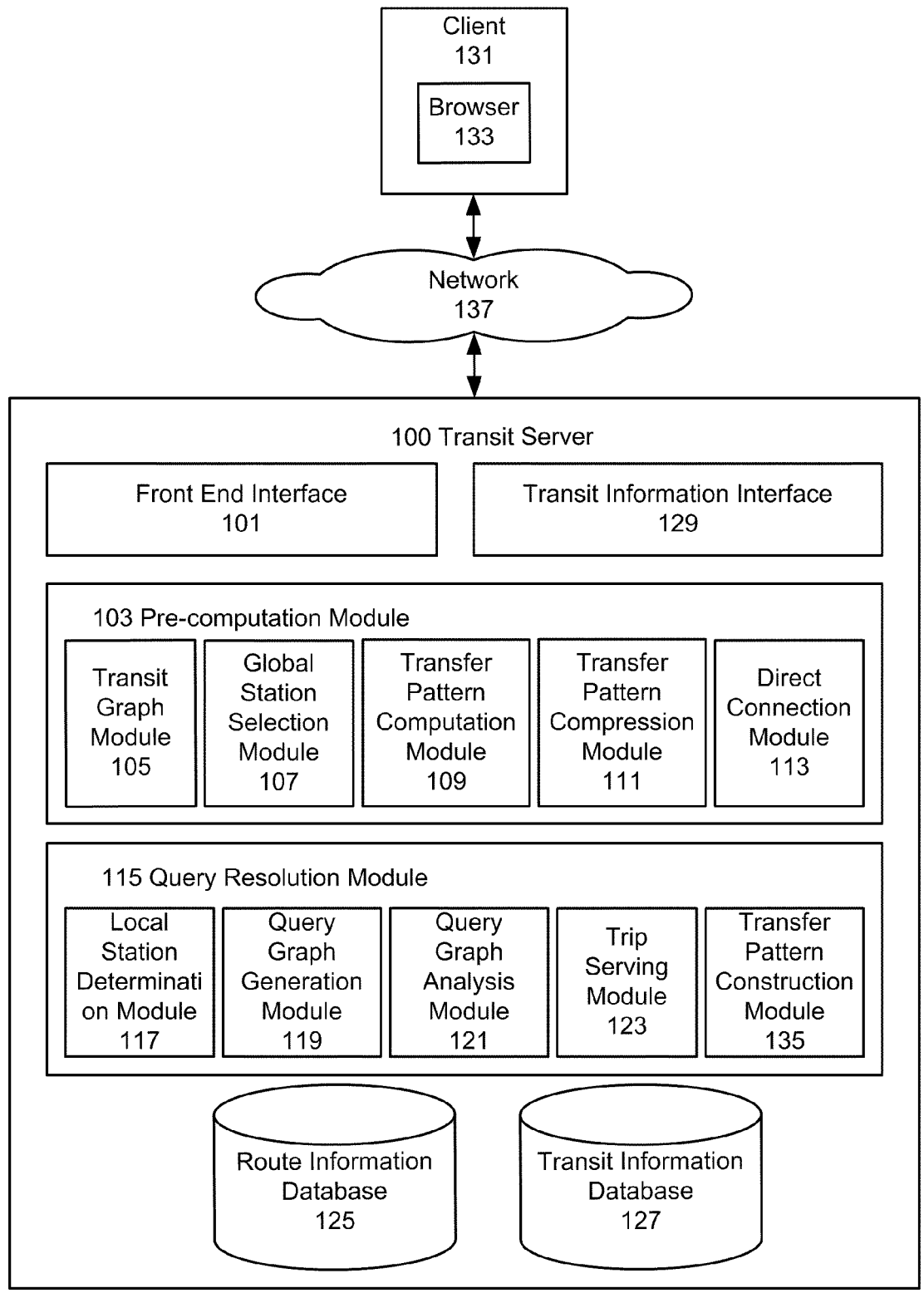
FIG. 1 is a high-level block diagram of a computing environment according to one embodiment.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

I. System Overview

A public transit travel planning system and methodology is provided that uses extensive pre-processing of transit information prior to query time in order to determine optimal public transit routes for journeys. An optimal public transit route is the best route in terms of time and/or other factors that can be used to reach a destination location from a starting location. A public transit route comprises directions from a starting location to a destination location using only public transportation (though multiple different types of public transportation may be used in a single route) and may include walking The route describes which transit stations are to be used for the journey, as well as any transfers to one or more transit vehicles (including transfers between different types of public transport vehicles) that need to be made in order to reach the destination.

The transit travel planning system receives transit information from transit agencies that provide public transportation such as bus lines or railway lines. The transit information describes trips between various locations using one or more forms of public transportation. The transit information may describe schedule information for public transit trips that describe a listing of the times that public transit vehicles arrive and/or depart from stations associated with the trips. Prior to query time, the transit travel planning system processes the transit information to determine optimal transfer patterns that describe routes between any two transit stations. The transfer patterns describe where transit vehicle transfers are made along each journey. Thus, the transit travel planning system determines the best route possible for any given pair of stations prior to query time.

To determine the optimal transfer patterns, the transit travel planning system generates a transit graph and its associated transit tables that represent information of the transit graph in table form. The transit graph is a representation of possible trips specified by the transit information from the transit agencies for a window of days such as a week or month. Generally, for each known trip, the transit graph comprises a series of nodes connected by directed arcs where each node represents an event at a station such as a public transit vehicle arriving or departing a station at a particular time. A pair of nodes are connected by a directed arc representing a public transit vehicle travelling from a first station (source node) to a second station (target node) in the pair.

To represent a trip in the transit graph, the transit travel planning system retrieves transit information for the trip starting at a first station and ending at a second station in the trip. The transit information comprises actual time and location (e.g., schedule) information for public transit vehicles at transit stations. The transit travel planning system constructs the transit graph based on the transit information associated with the trip. For each arrival and/or departure of a transit vehicle at a station, the transit travel planning system inserts a node into the transit graph representing the event at the station at a particular time.

The transit travel planning system connects nodes using directed arcs that describe the route of the trip. Each arc is then associated with a cost to reach the target node from the source node. The transit travel planning system uses the transit information associated with the trip to determine the cost for each arc. The transit travel planning system repeats the process described above for each trip in which transit information was received until the transit graph is constructed for each day within the window of days represented by the transit graph.

After construction of the transit graph, the transit travel planning system creates a series of transit tables based on the transit graph. The transit tables include information describing each node and arc in the transit graph, days within a window of days when each trip in the transit graph is valid, and the geographic locations of stations. The transit tables are essentially a table representation of the transit graph. In one embodiment, rather than creating the transit graph, the transit tables are generated from the transit information.

Using the transit graph and transit tables, the transit travel planning system determines all direct connection trips. A direct connection trip is a trip from a source station to a target station with no transfers. Although one or more stops may be made during the trip, the source station and target station are still directly connected since no transfers need to take place in order to reach the target station. Furthermore, the transit travel planning system determines which stations in the transit graph can be considered a global station. Global stations are stations where a transit vehicle transfer often takes place during trips that span a long distance. The direct connection information and global station information is then stored. For example, the direct connection information may be stored in table form.

Using the transit graph and direct connection tables, the transit travel planning system determines optimal transfer patterns that describe routes to reach any target (i.e., destination) station in the transit graph from any given source station with a minimal cost. In one embodiment, a transfer pattern is a sequence of transfers along a public transit route at various public transit stations (herein referred to as "stations") where a user leaves (i.e., alights) a public transportation vehicle and boards (i.e., transfers to) another public transportation vehicle; preferably a transfer pattern is optimized with respect to a cost function that takes into account travel time between stations, waiting time, and other cost factors. Generally, the transfer pattern of a journey includes the starting and target stations along with stations in which transit vehicle transfers take place. For example, consider a source station A and target station F where transfers occur at stations D and E. In this example, the transfer pattern is ADEF. In one embodiment, a transfer pattern describes the sequence of stations, without reference to particular times, for the station transfers, and hence is a pattern that can be instantiated with respect to multiple different starting times, rather than merely a pre-computed trip at a specific time of day.

Generally, the transit travel planning system uses various methodologies to determine optimal transfer patterns. The methodologies may or may not use the notion of global stations or may use a heuristic approach to determine the transfer patterns. Regardless of the methodology used, the transit travel planning system uses a graph search algorithm, such as Dijkstra's algorithm, to determine the best path in terms of cost to reach a target station from a given source station. Thus, the transit travel planning system results in one or more optimal transfer pattern for every pair-wise combination of source station and target station in the transit graph or no transfer patterns if no route exits.

The transfer patterns are stored for later use at query processing time. In one embodiment, each transfer patterns is stored individually and in complete form. Alternatively, rather than storing each transfer pattern completely, the transit travel planning system compresses the transfer patterns. The information included in a transfer pattern is essentially broken down into smaller pieces that can be compressed due to the redundancy of the information included in the transfer pattern. Once the transfer patterns have been compressed, the transit travel planning system stores the compressed transfer patterns.

At query processing time, the stored transfer patterns are used to generate transit routes in response to user queries for directions from a source location to a target destination. Generally, a user provides a request for directions for a journey i.e., from a source location which may be the user's current location or a location of interest to a target destination. The source location and target destination may respectively be associated with a source station and a target station rather than the user's current location and the location of interest. The request may also include a date and/or time associated with a departure or arrival event. The transit travel planning system then determines the transit stations that are nearby the source location and target destination. Thus, the transit stations near the source and target can be paired to form different source location and target destination pairs. The transfer patterns are determined for each pair of stations from the stored transfer pattern information that has been previously pre-computed. Generally, the transit planning system retrieves the stored transfer patterns associated with the pairs of stations.

With the transfer patterns, the transit planning system generates a query graph. The query graph is used to determine the optimal route from the source location to the target destination. The query graph includes only transit information that is associated with the query. Each station in a transfer pattern is represented as a node in the query graph and pairs of nodes are connected by directed arcs similar to the transit graph. Once the query graph is generated, the transit planning system determines direct connections between stations in the query graph using the stored direct connection transit information resulting in a plurality of direct connection trips between station pairs in the transfer patterns.

The determination of the direct connections is governed by the date and/or time received in the search query. That is, if the search included a departure time on a certain day, only direct connections on the specified day that depart some time after the provided departure time are retrieved. Likewise, if an arrival time is specified, only direct connections arriving prior to the arrival time are determined. Once the direct connection trips are determined, the transit travel planning system determines the optimal trips by performing a computation based on the cost of the direct connection trips. The computation results in a plurality of trips that are optimal based on various factors such as time or transit vehicle diversity. The optimal trips are then provided to the user to fulfill the search query.

Thus, at query time, since the transit information has already been processed by the transit travel planning system, very little computation is needed in order to fulfill the query. For example a query that requests the best direct connection trip from San Jose, Calif. to San Francisco, Calif. can be processed as a relatively fast and low cost look-up of the pre-processed transit information to retrieve a stored direct connection from San Jose to San Francisco. As another example if a query requests a trip from Mugello, Italy to Assen, Netherlands with a transfer at Donnington Park, UK, because an optimal transfer pattern has already been calculated and stored prior to query time, the query can be fulfilled via two direct connection queries on the preprocessed transit information. The transit travel planning system performs two look-ups to retrieve the direct connection from Mugello to the Netherlands and from the Netherlands to Donnington Park. Thus, the transit travel planning system of the present invention provides the shortest query time when fulfilling user queries of public transit directions.

Referring now to FIG. 1, there is shown a high-level block diagram of a computing environment in accordance with one embodiment of the present invention. A transit server 100 (i.e., a transit travel planning system) provides users with public transit (i.e., transportation) directions responsive to a query for a public transit journey at a given date and time using an extensive pre-processing approach of stored optimal transfer patterns in order to provide specific optimal public transit trips. While FIG. 1 shows one embodiment, it should be understood that all embodiments of the invention require the use of a computer system to perform the operations and store the various types of data described herein. Accordingly, in following discussion then, it should be assumed that all operations, steps, data, and the like are implemented by a combination of a computer system and programming logic, and do not occur in any way through mental steps or disembodied abstract ideas.

In one embodiment, a public transit journey comprises a time-specific route or path from a source (i.e., starting) location to a target (i.e., destination) location using only public transportation. Various forms of public transportation may include buses, light rail, subways, trolleys, commuter trains, ferries, or airplanes. One skilled in the art will recognize that that there are other forms of public transportation other than those listed herein and can be used as a conveyance to travel between locations on a public transit trip. For ease of discussion, a public transit trip will be referred to as a "trip" from here on.

By using the pre-processed optimal transfer pattern information, the transit server 100 performs a minimal amount of computation at query time in order to fulfill a query for a trip. This allows for the quickest response time to a user's query. Responsive to a user's query for transit directions from a starting location to a destination location at a particular time, the transit server 100 provides users with one or more optimal public transit routes for a desired journey.

In one embodiment, an optimal public transit route is a route from a station proximate the starting location to a station proximate the target location that is optimal in terms of cost. The cost of a trip may be based on time to reach the station proximate the target location and/or the number of transfers needed to reach the station proximate the target location according to one embodiment.

As shown in FIG. 1, the transit server 100 comprises various modules. As is known in the art, the term "module" refers to computer logic utilized to provide the specified functionality. Thus, a module can be implemented in hardware, firmware, and/or software controlling a general purpose processor. In one embodiment, modules are program code files stored on a storage device, loaded into memory, and executed by a processor or can be provided from computer program products (e.g., as computer executable instructions) that are stored in tangible computer-readable storage mediums (e.g., RAM, hard disk, or optical/magnetic media). Additionally, those of skill in the art will recognize that other embodiments of the transit server 100 shown in FIG. 1 can have different and/or other modules than the ones described here, and that the functionalities can be distributed among the modules in a different manner.

In one embodiment, the transit server 100 is in communication with a client 131 via a network 137, which is typically the internet, but can also be any network, including but not limited to any combination of a LAN, a MAN, a WAN, a mobile, wired or wireless network, a private network, or a virtual private network. While only a single client 131 is shown, it is understood that very large numbers (e.g., millions) of clients are supported and can be in communication with the transit server 100 at any time. The client 131 executes a browser 133, such as MOZILLA or INTERNET EXPLORER to provide a query to the transit server 100 for directions for a trip. The client 131 may include a variety of different computing devices. Examples of client devices 131 are personal computers, digital assistants, personal digital assistants, cellular phones, mobile phones, smart phones or laptop computers. As will be obvious to one of ordinary skill in the art, the present invention is not limited to the devices listed above.

In one embodiment, transit server 100 comprises a front end interface 101, a transit information interface 129, a pre-computation module 103, a query resolution module 115, a route information database 125, and a transit information database 127. The front end interface 101 receives transit queries from client 131. In one embodiment, the client 131 sends a query for a journey to the transit server 101. The query is received by the front end interface 101 and is communicated to the query resolution module 115 to fulfill the query.

The transit information interface 129 receives transit information regarding transit schedules of public transit systems from a plurality of different public transit agencies such as an airline, bus line, or any other public transit agency that provides public transportation trips. In one embodiment, each transit agency in communication with the transit server 100 provides transit information according to a specified format, such as the Google Transit Feed Specification (GTFS) described at http://code.google.com/transit/spec/transit_feed_specification.html. Receiving transit information in the GTFS format allows for the transit server 100 to receive information from different transit agencies in a uniform data format. In one embodiment, transit information includes public transportation schedules for the trip describing calendar dates when a transit vehicle(s) is making the trip and station information (e.g., the address) describing stations where stops are made along the trip. Other attributes of a trip may be included in the transit information such as the monetary cost to make the trip and times when stops are made at different transit stations. Once the transit information for trips is received, the transit information interface 129 stores the information in the transit information database 127. In practice, the transit information database 127 stores transit information from a plurality of different transit agencies. For example, in a typical metropolitan area, the transit information database 127 stores bus schedule information from a public bus system, train schedule information for local commuter trains, light rail, and long distance trains, subway schedules for a subway system, and so forth.

In one embodiment, the pre-computation module 103 performs a pre-computation process on the transit information prior to query time. The pre-computation module 103 uses the transit information stored in the transit information database 127 to determine a set of transfer patterns of all optimal routes between any two stations indicated within the transit information database 127. Using the transit information, the pre-computation module 103 also determines which stations can be reached directly from another station without having to make one or more transfers. These stations are said to be directly connected. The pre-computation module 103 stores the set of transfer patterns and direct connection information in the route information database 125.

The query resolution module 115 determines optimal trip routes to fulfill user queries for directions from a starting location to a destination location at a particular time. The query resolution module 115 uses the pre-processed optimal transfer patterns and direct connections provided by the pre-computation module 103 to determine the optimal trips. Generally, at query time the query resolution module 115 performs a reduced set of computations to fulfill a query by retrieving from the route information database 125 a number of transfer patterns associated with the starting location and destination location related to the query and evaluating each trip that can be instantiated from the transfer patterns to determine optimal trips. Since the number of transfer patterns relevant for a particular query is small since only the transfer patterns associated with the starting and destination locations need to be evaluated, independent from the total number of transfer patterns, the worst case query processing time is typically very fast.

II. Pre-Computation Processing

Figure 2:
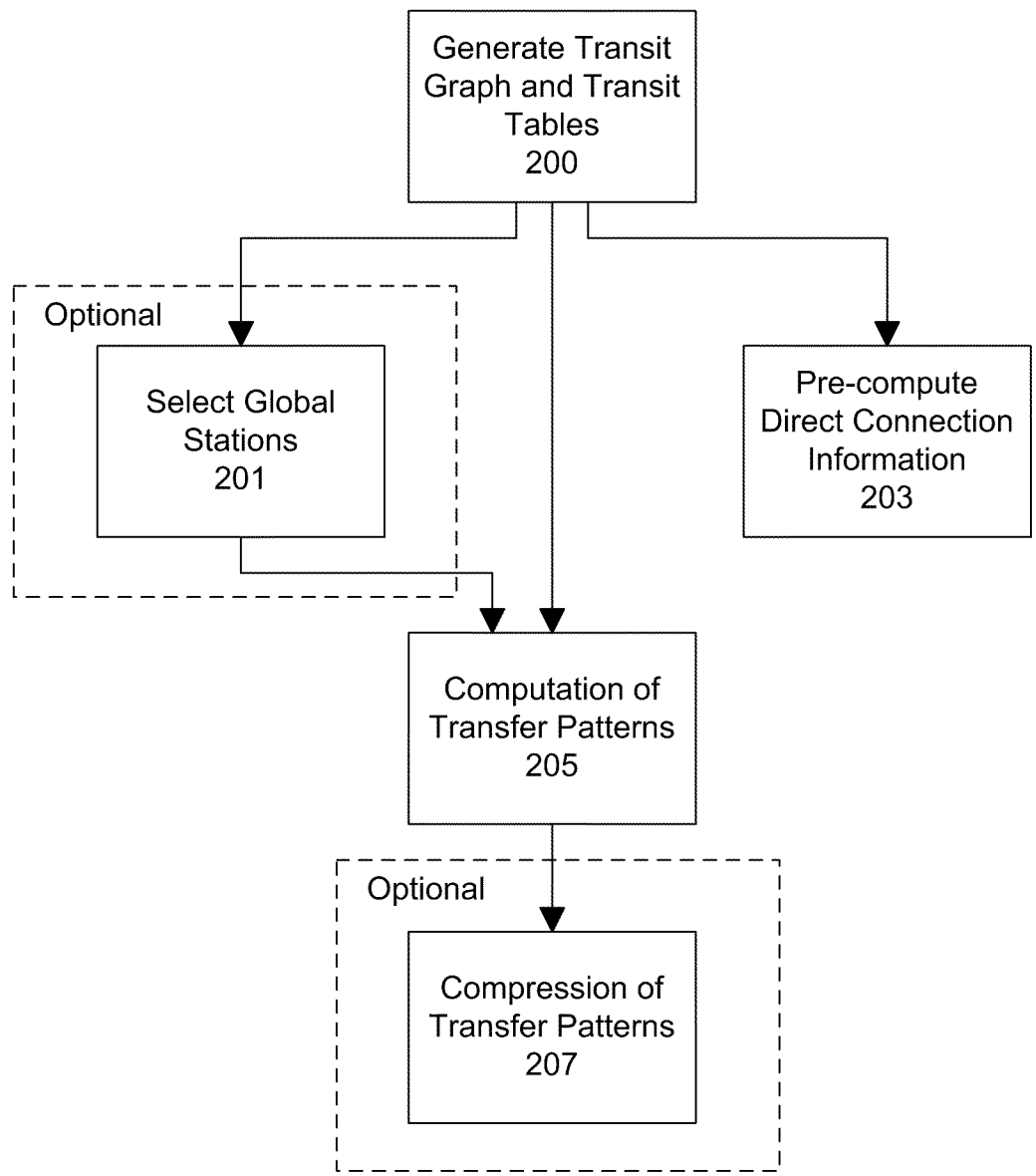
FIG. 2 is a process flow diagram of stages of a pre-computation process of public transformation information prior to query time according to one embodiment.

As shown in FIG. 1, the pre-computation module 103 comprises a transit graph module 105, a global station selection module 107, a transfer pattern computation module 109, a transfer pattern compression module 111, and a direct connection module 113. One skilled in the art can recognize that the pre-computation module 103 may include other modules in different embodiments of the present invention. Referring now to FIG. 2, in one embodiment the pre-computation process of the pre-computation module 103 comprises the following functional stages:

200: Generate transit graph and transit tables.
201: Select global stations.
203: Determine direct connection trips.
205: Computation of transfer patterns.
207: Compression of transfer patterns.

Each functional stage of the pre-computation process will be further described below.

1. Generation of Transit Graph and Transit Tables

In the first stage of the pre-computation process the transit graph module 105 generates 200 a transit graph and its associated transit tables. A transit graph is a representation of all possible trips stored in the transit information database 127 for a given time period such as a week or month. Generally, a trip describes stops made by a single transit vehicle at various transit stations at specific times without any transfers. In other words, a trip is a single transit vehicle making a series of stops (or no stops) at some given times of day without any transfers. In one embodiment a journey describes one or more trips required to travel from a source station to a target station. That is, a journey from a source station to a target station may be a series of trips if a transfer(s) to another transit vehicle is required to reach the target station. Thus, a journey may include the use of one or more transit vehicles to reach the target station. By generating the transit graph, the transit graph module 105 creates a representation of an extensive network of trips provided by different public transit agencies for the given time period. The structure of the transit graph will be described in further detail below.

Generally, for each known trip, the transit graph comprises a series of nodes connected by arcs to represent the trip. Each node in a trip represents an event made by a public transit vehicle at a transit station at a particular time. A directed arc connects a node representing one station (source node) to a node representing a second station (target node) where a public transit vehicle travels from the first station to the second station and stops at the second station. For example, a journey from a station in Mountain View, Calif. to a station in San Francisco, Calif. via Cal Train may include a single stop at a station located in Palo Alto, Calif. Thus, the transit graph would include a node representing the event at the Mountain View station connected by a directed arc to a node representing the arrival event at the Palo Alto station, which is further connected by a directed arc to a node representing the San Francisco station.

Figure 3:
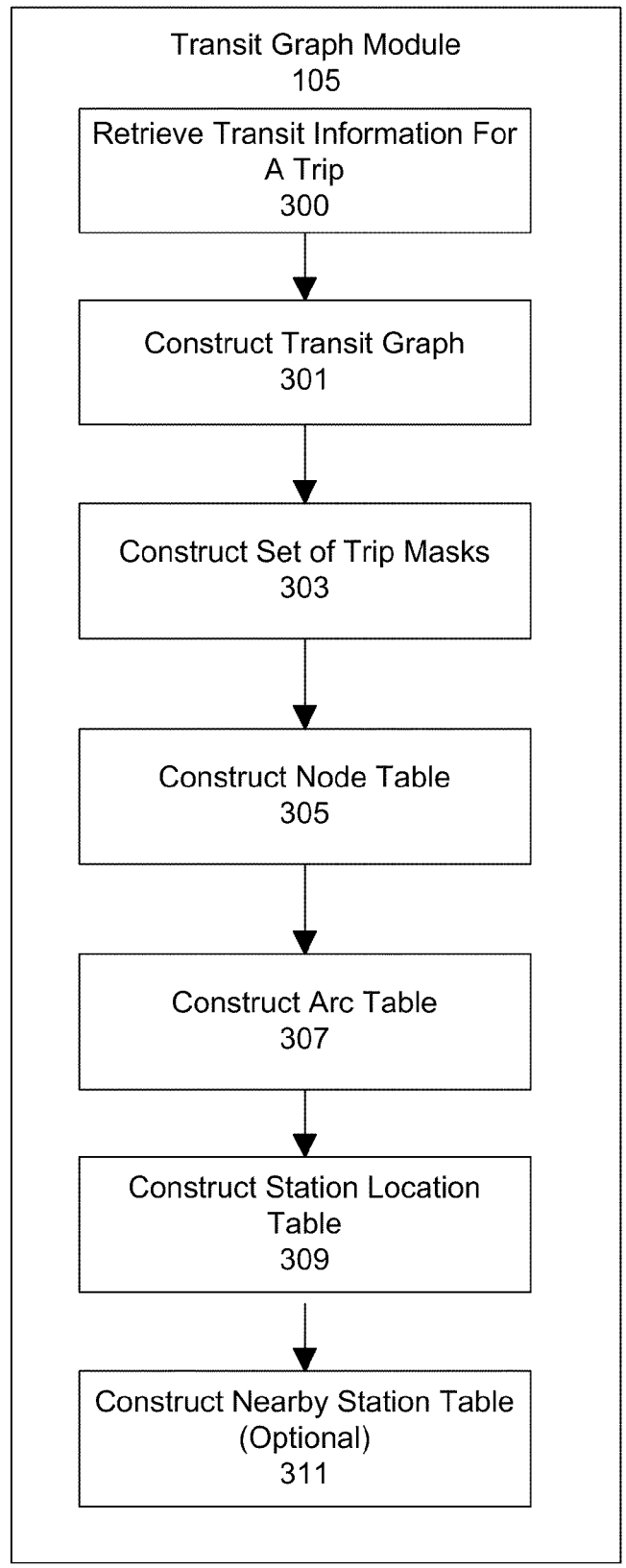
FIG. 3 is a process flow diagram for generating a transit graph according to one embodiment.

Referring now to FIG. 3, there is shown one embodiment of a flow diagram illustrating the process performed by the transit graph module 105 to generate a transit graph and its transit tables. For ease of description, the generation of the transit graph will be described in reference to a single trip within the time period represented by the transit graph. In one embodiment, as will be further described below, specific arcs in the transit graph are associated with trip information related to a trip from which the arcs were generated. This information describes the days that the associated trip is valid within a window of time. Thus, note that the process performed by the transit graph module 105 described herein for a single trip is repeated for each known trip in order to generate a transit graph that includes trip information for all known trips. Thus, using the teachings described herein, the transit graph module 105 can also update a transit graph for a new time period that describes all possible trips within the time period as described in the public transit information stored in the transit information database 127.

First, the transit graph module 105 retrieves transit information 300 for a trip starting at a source station and ending at a target station. In one embodiment, the transit graph module 105 retrieves trip information related to the trip from the transit information database 127, and assigns a trip identifier (ID) to differentiate the trip from the other trips in the transit graph. As previously mentioned, the trip information for a trip includes the scheduled operation days for the trip and station information describing times and station locations where stops are made along the trip. In other words, the transit graph module 105 determines a route for the trip from the source station to the target station where the route describes stations where arrival and departure events are made along the route and a schedule of the stops.

Using the transit information, the transit graph module 105 constructs 301 (i.e. generates) a transit graph based on the transit information. That is, the transit graph module 105 determines from the transit information the given source station and target station for the trip and all intermediate stations where a stop and/or transfer(s) is made between the starting and target stations. The transit graph module 105 also determines schedule information related to each station that describes when the public transit vehicle arrives and departs from a station.

For each arrival and/or departure of the vehicle at a station, the transit graph module 105 inserts up to two nodes into the transit graph representing respectively a departure event and an arrival event, at their respective time of day. Thus, if a vehicle does not arrive/depart at a station, no node is created at this station for this trip since no departure or arrival event occurs at this station for the trip. Since nodes in the transit graph are generated from the transit information, each node is associated with a transit vehicle at some station at a specific time. In one embodiment, a node in the transit graph can either be a station node or an onboard node. A station node represents a vehicle at a station that a user can board (i.e., enter) in order to make a trip. In contrast, an onboard node represents a public transit vehicle that a user is currently boarded that is located at the station associated with the node. Nodes in the transit graph are connected to one another via arcs that describe the route of a trip according to one embodiment. Generally, there are four types of arcs: boarding arcs describing a transit vehicle being boarded at a station, alighting arcs describing a transit vehicle being exited at a station with optional walking if a person must walk to another station to board a transit vehicle to complete a journey, waiting arcs describing a person waiting at a transit station, and transit arcs describing staying onboard a vehicle between two stops of a trip.

Arcs will now be described in reference to the onboard and station nodes of station A and station B. The subscript of "O" represents an onboard node while a subscript of "S" represents a station node. The "→" symbol represents an arc between two nodes. Below is shown a description describing the transit events that may occur between stations.

1. $A_S \rightarrow B_O$ corresponds to entering a transit vehicle at station A and travelling to station B without stops in between station A and station B.
2. $A_O \rightarrow B_S$ corresponds to exiting a vehicle at station A and walking to station B.
3. $A_O \rightarrow A_S$ corresponds to exiting a vehicle at station A and staying at the same station.

4. $A_O \rightarrow B_O$ corresponds to being onboard a vehicle at station A and remaining onboard the same vehicle at least until arriving at station B.
5. $A_S \rightarrow A_S$ corresponds to waiting at station A and not boarding the transit vehicle departing at station A at that time.

As mentioned above the transit graph module 105 analyzes the transit information for each trip to determine the events taking place during the trip. Based on the event, the transit graph module 105 places corresponding nodes (either station or onboard) in the transit graph and connects the nodes with arcs. The type of arc connecting a pair of nodes is based upon whether the nodes being connected are station or onboard nodes. For example, if the transit information describes that a transit vehicle is boarded at station A and travels to station B without a transfer, the transit graph module 105 includes a station node associated with station A in the transit graph and includes an onboard node associated with station B in the transit graph. Thus, the arc connecting the nodes is a boarding arc. In another example, if an onboard node is connected to a station node, the arc connecting the nodes is an alighting arc.

Figure 4:
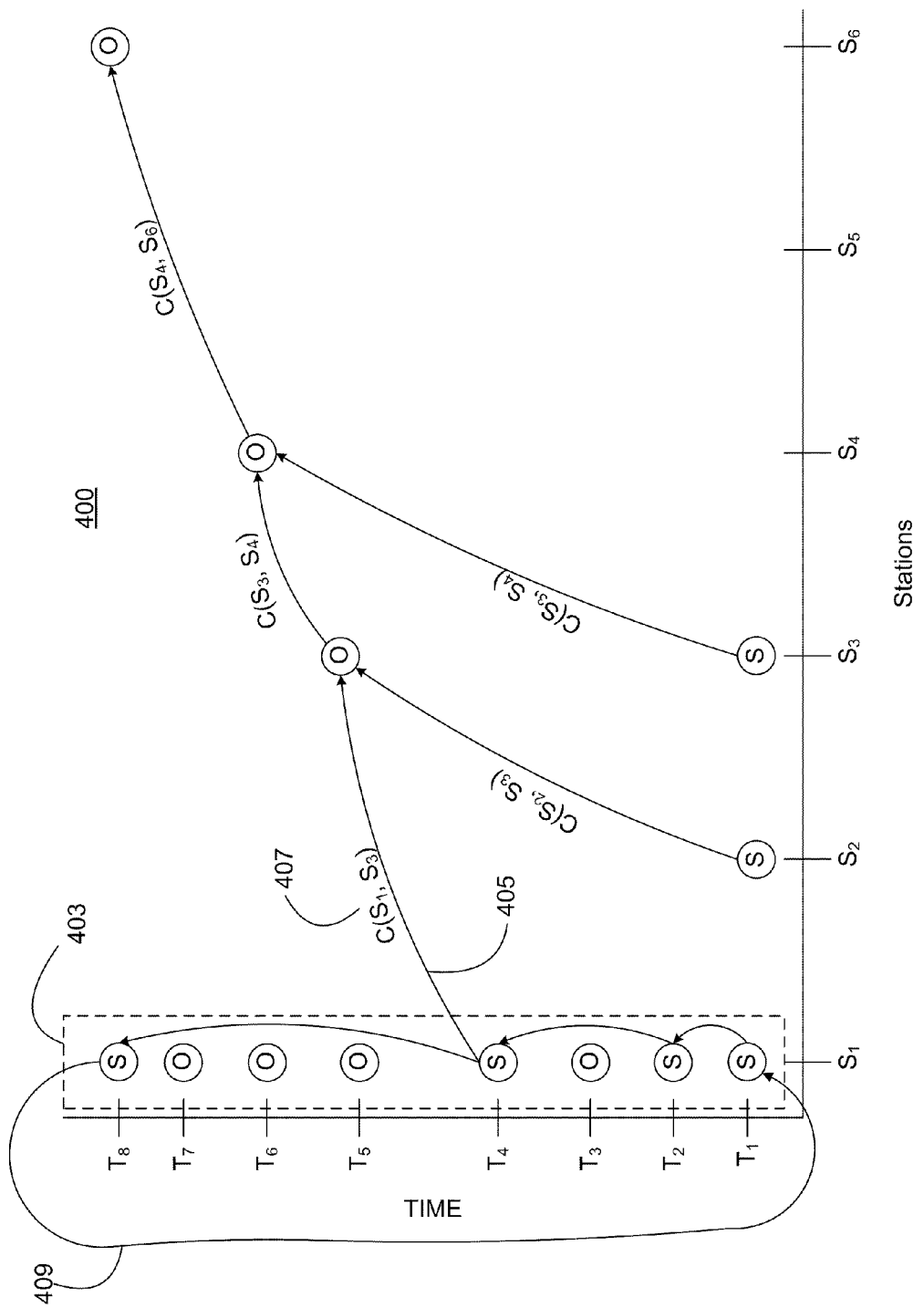
FIG. 4 illustrates an example transit graph according to one embodiment.

To describe waiting arcs, the notion of time is represented in the transit graph. Referring now to FIG. 4, there is shown a portion of a transit graph. Here, in this illustration, the transit graph 400 is shown with the nodes thereof organized with respect to a Y-axis and an X-axis. The Y-axis of the transit graph represents time and the X-axis represents stations. It is appreciated that the X and Y axes here are illustrated entirely as a convenient way to explain the use of time in the transit graph, and in actual practice the transit graph stored in the route information database 125 does not include an X or Y axis, nor are the nodes of the graph arranged in a spatial manner as shown in FIG. 4.

In this illustration, the Y-axis is a time representation of a single day. To explain the notion of time in the transit graph, for each station represented in the X-axis, the transit graph module 105 adds a series of nodes to the transit graph, which are here illustrated as arrayed along the Y-axis. Each node in the series associated with a station represents a transit event that occurs at the station at the particular time associated with the node.

As shown in the transit graph, station $S_1$ includes a series of nodes at different time intervals. Nodes labeled with an "S" are considered station nodes and nodes labeled with an "O" are considered onboard nodes. Each station node associated with the given station is associated with some event occurring at the station at a particular time. In one embodiment, the station nodes for all stations are sequentially linked based on time in order to represent a person waiting at that particular station. For example, in the transit graph the station nodes for $S_1$ are sequentially connected in time representing the notion that a person can wait at station $S_1$ at time period between $T_1$ and $T_4$. In one embodiment, the transit graph module 105 infers trips from information present in the transit graph by connecting each station node of a given station to the next departure event occurring at the given station via an arc.

For ease of discussion, boarding, alighting, and walking arcs are now described without reference to time. Assume the transit graph module 105 is representing a journey from the transit information that describes a source station A to target station D that has intermediate stops at stations B and C, but no transfers. Note that in this scenario, a single trip is considered a journey. The journey would be represented as follows, using this notation:

$$A_S \rightarrow B_O \rightarrow C_O \rightarrow D_O$$

Per the notation above, $A_S \rightarrow B_O$ describes a vehicle being boarded at station A and traveling to station B. $B_O \rightarrow C_O$ describes being onboard the vehicle at station B and staying on the vehicle when the vehicle arrives at station C. $C_O \rightarrow D_O$ describes a similar scenario as $B_O \rightarrow C_O$, but since station D represents the target station, the onboard node represents arrival at the destination.

To represent the journey in the transit graph, the transit graph module 105 represents each arrival/departure event as a node. However, as previously mentioned, each node corresponds to either a station node or an onboard node. The transit graph module 105 determines which nodes to use for a pair of stations in the trip based on the transit event occurring between the stations. Using the example described above, since the transit vehicle is being boarded at station A and the vehicle travels to station B without a transfer being made, the transit graph module 105 would represent the event at station A as a station node and the event at station B as an onboard node. Next, since the vehicle departs from station B and travels to the target station D only stopping at station C, but without any transfers, the events occurring at stations C and D would be represented by the transit graph module 105 as onboard nodes.

As another example, assume the same journey discussed above, except that a transfer occurs at station C. Thus, the journey requires two trips since a transfer occurs at station C. This journey would have the following representation in the transit graph:

$$A_S \rightarrow B_O \rightarrow C_O \rightarrow C_S \rightarrow D_O$$

Using the notation described above, $B_O \rightarrow C_O$ represents the transit vehicle arriving at station C from station B. $C_O \rightarrow C_S$ describes that the vehicle at station C is departed and the person who left the vehicle waits at station C in order to board another transit vehicle that departs from station C.

Continuing the above example, in the transit graph the representations of the events at stations A and B would be a station node for the event at station A and an onboard node for the event at station B per the description above. For station C, the transit graph module 105 would represent the transit event occurring at station C via two nodes: a station node and an onboard node. From the onboard node of station B, the transit graph module 105 would connect an arc to the onboard node of C that describes the arrival event at station C and being on the transit vehicle at that time. From the onboard node at station C, the transit graph module 105 would connect another arc to the station node of C representing the user exiting the transit vehicle at station C and waiting at the same station for the next transit vehicle.

To further illustrate the use of time within the transit graph, refer back to FIG. 4. As mentioned previously, in this illustration, the Y-axis is a time representation of a single day. For each station represented in the X-axis, the transit graph module 105 adds a series of nodes to the transit graph, which would be illustrated as arrayed along the Y-axis. Each node in the series associated with a station represents a transit event that occurs at the station at the particular time associated with the node. The transit graph module 105 uses the scheduling information from the stored transit information to determine the time information for each node. Thus, for each station, the transit graph module 105 includes a node for every instance in time that a vehicle may arrive or depart from the station.

In one embodiment, each arc connecting nodes of a trip in the transit graph has an associated cost determined by the transit graph module 105. Each cost describes the price to reach the target node from the source node connecting the arc in terms of various factors that may or may not include monetary cost. The transit graph module 105 analyzes the stored transit information associated with each trip to determine the costs for arcs.

In one embodiment, the cost for an arc is a multi-dimensional cost function. The first dimension of the cost function is based on time. The transit graph module 105 analyzes the transit information to determine the time difference between the arrival time at the target node and the departure time of the source node. The total time to reach the station associated with the target node is associated with the arc connecting the target node with the source node as the first dimension of the cost function. In one embodiment, the duration is represented in seconds although other representations of time can be used in other embodiments.

The second dimension of the cost function is based on various factors that may include monetary cost, total number of transfers, and/or walking costs according to one embodiment. The aggregation of these various factors results in a penalty that is included in the total cost. The transit graph module 105 determines the penalty for an arc based on the transit information associated with the leg of the trip.

As an example, if a transfer occurs at a station, the penalty of the arc can be increased. The monetary costs of a journey may also be factored into the penalty. The greater the monetary cost to reach a station can result in a higher penalty if a journey involves the use of more than one transit vehicle. Also, the distanced walked from one station to another in order to make a transit vehicle transfer may be factored into the cost of a trip. The weighting of the different factors on a penalty can be adjusted by a system administrator of the transit server 100.

The transit graph module 105 performs the process described above to generate in the transit graph the nodes representing the journey from the information in the transit information database 127. The transit graph module 105 repeats the process for each stored journey that is valid within the time period that the transit graph represents until all the trips are represented in the transit graph.

In one embodiment, rather than creating a new transit graph for each day, for each station in the transit graph the transit graph module 105 creates a station node for each departure event that occurs at the station that day. The transit graph module 105 connects the station nodes via waiting arcs. The last station node of the day is assigned a waiting arc 409 that points back to the first station node of the day. This represents waiting at the station past midnight until the next departure event that takes place at the station the following day. As for the onboard nodes in the transit graph, each onboard node is associated with one or more trips and thus inherently include information that describes when the one or more trips are valid (i.e., operating) within a number of days within a given time period In FIG. 4, the transit graph 400 is a function of time and public transit stations according to one embodiment. The transit graph 400 represents events (i.e., arrival or departure) made by a public transportation vehicle at various stations between $S_1$ and $S_6$ at various times $T_1$-$T_8$ as nodes in the graph connected by arcs 405. Using the transit information, the transit graph module 105 has constructed the transit graph 400 that includes three journeys. Each arc in the transit graph 400 includes a cost 407 to travel from the station representing the source node to the station representing the target node.

For example, one journey illustrated in the transit graph 400 is a trip from station $S_1$ at time $T_4$ to station $S_6$ at time $T_g$. As shown in the transit graph 400, the node at station $S_1$ at time $T_4$ is a station node as denoted by the "S" located within the node. The node at station $S_3$ at time $T_5$ is an onboard node represented by the "O" in the node. The same node designation is used in the remaining nodes in the transit graph 400.

The route described by the journey represents a vehicle starting at station $S_1$ at time $T_4$ and proceeding to make a stop at station $S_3$ at time $T_5$ followed by another stop at station $S_4$ at time $T_6$. From station $S_4$ at time $T_6$ the vehicle reaches the destination at station $S_6$ at time $T_8$. Note that although the journey included the vehicle passing station $S_2$ between times $T_4$ and $T_5$, a node representing station $S_2$ between $T_4$ and $T_5$ is not created since the vehicle did not make a stop at station $S_2$.

Additionally, the transit graph 400 also includes a journey from station $S_2$ at time $T_1$ to station $S_6$ at time $T_8$ as well as a journey from station $S_3$ at time $T_1$ to station $S_6$ at time $T_8$. Note that the vehicle starting from station $S_2$ at time $T_1$ arrives at station $S_3$ at the same time of the vehicle that departed from station $S_1$ at time $T_4$. In one embodiment, the single node at station $S_3$ at time $T_5$ represents both events.

Furthermore, transit graph 400 illustrates a series of nodes 403 for station $S_1$ that represent each instance in time that a vehicle may arrive or depart from the station. Although only time $T_4$ illustrates a vehicle departing from station $S_1$, it is understood that for ease of description, arcs illustrating departures from nodes of station $S_1$ have been omitted. The node representing the last station node of station $S_1$ is shown to point back to the station node representing the first time of the day that station $S_1$ is operational.

Referring back to FIG. 3, once the transit graph has been constructed, the transit graph module 105 creates a series of transit tables based on the transit graph. In one embodiment, the transit tables indicate information associated with the arcs and nodes of the transit graph. The transit tables essentially are a table representation of the transit graph that indicates information about each node and arc in the transit graph as well as other information associated with the transit graph. The transit graph module 105 stores the information described in the transit graph in various transit tables. The transit tables will be described in further detail below. Note that in one embodiment, the transit tables are directly created from the transit information rather than generating the transit graph followed by the creation of the transit tables from the transit graph.

The transit graph module 105 constructs 303 a set of trip masks based on the transit information. In one embodiment, the set of trip masks is represented as a table that lists all possible trips and describes when the trips are valid. Each row in the table represents a trip mask of a trip. That is, each trip mask describes the days within a time period that a vehicle is making a particular trip indicated in the trip mask. In one embodiment, the time period in a trip mask is 60 days. Different time periods can be used in other embodiments. An example trip mask is as follows:

| | | Example Trip Mask | | |
| --- | --- | --- | --- | --- |
| Trip ID | Jun. 8, 2009 | Jun. 9, 2009 . . . | . . . Aug. 7, 2009 | Aug. 8, 2009 |
| $T_1$ | 0 | 1 | 1 | 1 |
| $T_2$ | 1 | 0 | 0 | 0 |
| $T_3$ | 0 | 0 | 1 | 1 |
| $T_N$ | 0 | 1 | 1 | 0 |

Each row in the table is associated with a specific trip. Each column represents a day or date within a selected period of time. In one embodiment, a "1" in the trip mask for a given day indicates that the trip is valid on that day, while a "0"

indicates that the trip is not valid on the day. Different notations can be used to denote whether a trip is valid or invalid in other embodiments. Once the trip mask has been constructed, the transit graph module 105 stores the trip mask in the transit information database 127.

In the above example, the trip mask lists trips $T_1$, $T_2$, through $T_N$. The remaining columns represent days between a specified start date (e.g., Jun. 8, 2009) and end date (e.g., Aug. 8, 2009). For each date, either a "1" or a "0" is listed for each trip indicating whether a trip is valid or invalid on that date. For example, on Jun. 8, 2009, only trip $T_2$ is valid. All other trips listed in the trip mask are not operational. On the following day, only trip $T_1$ and $T_N$ are operational.

Once the trip mask has been constructed, the transit graph module 105 constructs 305 a node table. In one embodiment, the transit graph module 105 generates the node table based on the transit graph. The node table specifies an identification (ID) for each node and the station ID of the station that is associated with each node. The node table further specifies the node type associated with each node. The node type describes whether the node is a station node or an onboard node. The node table also includes the time of event associated with each node. The event may be an arrival or departure depending on the node type. Lastly, the node table includes the trip ID that points to the trip mask to indicate when the node is valid. Note that in one embodiment, only onboard nodes are associated with trip IDs since station nodes may be associated with a person simply waiting at a station which is not part of a specific trip. Once the node table is constructed, the transit graph module 105 stores the node table in the transit information database 127. Below is shown one example of a node table.

| Example Node Table | | | | |
|---|---|---|---|---|
| Node ID | Station ID | Event Time | Node Type | Trip ID |
| $N_1$ | A | 8:00 | Onboard | $T_8$ |
| $N_2$ | B | 16:00 | Station | N/A |
| $N_3$ | C | 2:00 | Station | N/A |
| $N_4$ | A | 12:00 | Onboard | $T_{345}$ |
| $N_N$ | D | 20:00 | Onboard | $T_{50}$ |

The table shown has five columns: Node ID, Station ID, Event Time, Node Type, and Trip ID. The Node ID column lists all the nodes of a transit graph $N_1$ through $N_N$. Each node has a corresponding Station ID, Event Time, Node Type and Trip ID. For example, node $N_1$ is associated with station A. The table indicates that node $N_1$ is an onboard node with an event time at 8:00. Thus, the onboard node may represent a transit vehicle arriving at station A without a person exiting the vehicle or the transit vehicle arriving at station A and a person exiting the transit vehicle at station A. The node table also indicates that the onboard node is associated with trip ID $T_8$ that points back to the trip mask to indicate the dates that the trip associated with the node is valid. As another example, node $N_3$ is associated with station C and is a station node. The event associated with node $N_3$ occurs at 2:00. Since the node is a station node, the event that takes place at 2:00 may be a waiting event or a boarding event at station C. As mentioned above, station nodes do not refer back to a trip ID.

After the node table is constructed, the transit graph module 105 constructs 307 an arc table. The arc table specifies information related to each arc in a transit graph. In one embodiment, the arc table species the source node ID and target node ID of each arc along with the penalty for each arc. The arcs themselves are not explicitly identified. Rather, an arc is inferred based on the specific nodes that are a connected by an arc. Since each node in the transit graph is associated with a unique node ID, the arc can be determined based on the node IDs of the nodes being connected by an arc. The arc table also describes the penalty associated with each arc inferred from the source and target nodes. Once the arc table is constructed, the transit graph module 105 stores the arc table in the transit information database 127. Below is shown one example of an arc table.

| Example of Arc Table | | |
|---|---|---|
| Source Node ID | Target Node ID | Penalty |
| $N_1$ | $N_{24}$ | 100 |
| $N_{50}$ | $N_{32}$ | 150 |
| $N_8$ | $N_{10}$ | 200 |
| $N_{24}$ | $N_{94}$ | 50 |

The table includes three columns: source node ID, target node ID and penalty. The source node ID and target node ID columns list all source and target node pairs in the transit graph which infer what nodes are connected by arcs. For example, the station node ID and target node ID of ($N_1$, $N_{24}$) indicates that these two nodes are connected by an arc. In this example, the arc has a penalty of 100.

After the arc table is constructed, the transit graph module 105 constructs 309 a station location table. The station location table describes the geographic location of each station in the transit graph. In one embodiment, each station's geographic location is represented by the latitude and longitude coordinates of the station. Alternatively, other methods of describing a geographic location can be used such as an address of a station. Once the station location table is constructed, the transit graph module 105 stores the arc table in the transit information database 127. Below is shown one example of a station location table.

| Station ID | Geographic Location |
|---|---|
| A | (33.58, −85.85) |
| B | (41.48, −120.53) |
| C | (38.22, −122.28) |
| D | (37.37, −121.92) |

In the above example, the station location table includes the station ID column which lists all the stations in the transit graph. The station location table also includes a geographic location column that lists each station ID's geographic location in latitude and longitude coordinates. For example, station D has a geographic location of 37.37 N latitude and −121.92 W longitude which corresponds to an area in San Jose, Calif.

In an embodiment, the transit graph module 105 constructs 311 the nearby station table in order to assist in creating the arc table described above. Specifically, the transit graph module 105 uses the nearby station table to create transfer arcs. As previously mentioned, transfer arcs (which may or may not include walking, depending on whether a person transfers at the station that the person arrived at or walks to another station) are created from each onboard node to the earliest reachable departure event at all stations nearby the station that the person arrived at including the station itself. Rather that storing the transfer arcs in memory, the nearby station table is stored and the transfer arcs are built on demand for the transfer arcs. For each station in the table, the transit graph module 105 determines all stations that are within a radial distance from the given station using the stored transit information. Stations within the radial distance are considered "nearby" or "local" to a station. In one embodiment, the radial distance may be two miles or can be other distances in different embodiments. Thus, depending on the radial distance of the transit server 100 as determined by a system administrator, a given station may not have a nearby station. Once the nearby station table is constructed, the transit graph module 105 stores table in the transit information database 127. Below is shown one example of a nearby station table.

| Example of Nearby Station Table | |
|---|---|
| Station ID | List of Nearby Station IDs |
| A | {(A, 60), (D, 60), (Q, 60), (R, 120) (Z, 120), (Y, 3200)} |
| B | {(F, 120} |
| C | None |
| D | {(D, 60), (M, 60), (E, 120), (K, 180)} |

The table includes two columns: Station ID and List of Nearby Station IDs. For each station ID, the list of nearby station IDs indicates the stations that are considered "nearby" the station and the minimum time duration needed to transfer from the station to a nearby station. That is, the list of nearby station IDs indicates those stations that are within a specified radial distance and the time needed to reach the nearby stations. For example, station A may be near station D, station Q, station R, station Z, and station Y. To transfer from station D from station A, a minimum time of 60 seconds is needed to make the transfer, for example. In contrast, station C may not have any nearby stations. Furthermore, note that in one embodiment a station may be included in its list of nearby station IDs. This indicates a minimum duration of time needed (i.e., a safety buffer) to transfer from one transit vehicle to another transit vehicle at a single station. For example, for station A, its nearby station list indicates a minimum time of 60 seconds is needed to complete a transfer at station A. Note that not all stations may be included in their nearby station list if no transfers occur at that station as shown in the list of nearby stations for station B in the example shown above.

2. Global Station Selection

Referring back to FIG. 2, in the second stage (optional) of the pre-computation process, the global station selection (GSS) module 107 selects (i.e., determines) global stations. In one embodiment, global stations are stations where a transfer is likely to occur at during long connections. That is, in trips that span a long distance, global stations are stations where a transfer often occurs. The GSS module 107 selects global stations based on the number of transit routes that transfer at a station or based on a time-independent heuristic. Each embodiment will be described in further detail below.

Figures 5A, 5B:
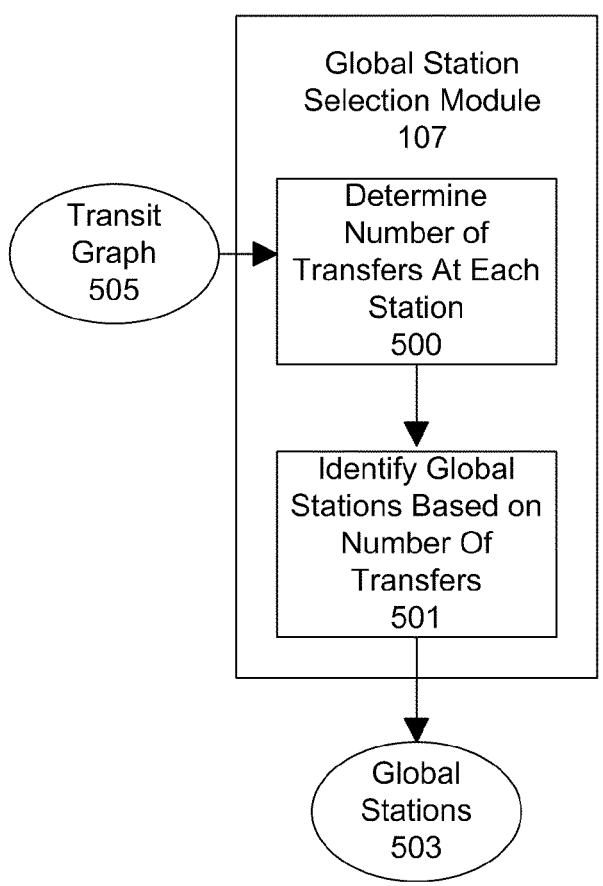
FIGS. 5A-5B are process flow diagrams for determining global stations according to one embodiment.

Referring now to FIG. 5A, there is shown a flow diagram of a method performed by the GSS module 107 for calculating global stations based on the number of routes that transfer at a station. The GSS module 107 receives as input the transit graph FIG. 505. From the transit graph, the GSS module 107 determines FIG. 500 the number of transfers that occur at each station. The GSS module 107 analyzes the transit graph to determine the number of times that a vehicle transfer occurs at each station in the transit graph. The GGS module 107 identifies FIG. 501 global stations based on the number of transfers that has occurred at each station. In one embodiment, a transfer threshold is applied that specifies the minimum number of transfers that must occur at a station in order to be considered a global station. The GGS module 107 filters each station according to the transfer threshold and the remaining stations are considered the global stations FIG. 503.

Referring now to FIG. 5B, there is shown another embodiment of a process flow of the GGS module 107 for determining global stations based on the time-independent heuristic. The GGS module 107 receives as input the transit graph FIG. 505. The GGS module 107 then groups 507 stations nodes for each station in the transit graph into a single node. As previously mentioned above, each station has one or more nodes representing various times in which a vehicle may be arriving or departing from the station. Of these nodes, a subset are station nodes. The GGS module 107 groups the station nodes for each station to form a station node group for the station. For example, the eight nodes of station $S_1$ represented in FIG. 4, assuming they are all station nodes, would be grouped in order to form a station node group that comprises the eight nodes.

The GGS module 107 then groups 509 onboard nodes. In one embodiment, the GGS module 107 groups the onboard nodes in the transit graph that have the same sequence of preceding stations and where no overtaking occurred between the vehicles represented by the onboard nodes to form onboard groups. That is, the GGS module 107 groups similar trips over the course of the day. In one embodiment, similar trips are trips that do not overtake each other and follow the same sequence of stations along the trip. For each group of trips, the GGS module 107 groups the first onboard node of each trip of the group into an onboard node group. Note that onboard node group represents onboard nodes at a single station since the groups are from similar trips. The GGS module 107 then groups the second onboard node of each trip of the group into a second onboard node group and so on until all the onboard nodes have been grouped.

Once the GGS module 107 has grouped the station nodes and onboard nodes of the transit graph, the GGS module adds 511 arcs between the groups. In one embodiment, the GGS module 107 analyzes the ungrouped representation of the transit graph and determines whether at least one arc existed between two nodes in the transit graph that belong to the different station node groups or onboard node groups. The GGS module 107 adds an arc between the different groups if an arc did exit between the two nodes in the transit graph.

The GGS module 107 then determines 513 a cost for each arc in the grouped representation of the transit graph. In one embodiment, for each arc between two groups, the GGS module 107 determines from the transit graph, each pair of nodes that are connected via an arc in the transit graph where each node in the pair belongs to the two different groups that are connected. Essentially, the GSS module 107 creates a set of pairs of nodes from the transit graph that are connected and belong to the pair of groups that are connected. The GSS module 107 determines from the set which pair of nodes is associated with the minimum cost and assigns 515 the minimum cost to the arc between the two groups in the grouped transit graph.

In one embodiment, the grouped representation of the transit graph is said to be time-independent since the nodes that use to carry a time in the transit graph were flattened into node groups that do not carry the aspect of time. Since each node group in the grouped representation of the grouped transit graph represents similar nodes across time, the resulting transit graph is considered time-independent since the node groups are not associated to a particular time any more.

Next, the GGS module 107 applies 517 Dijkstra's algorithm repeatedly, each time taking a random station group as the source (i.e., all contracted nodes belonging to this station node group are the source of the shortest path search) to determine the shortest path in terms of cost. Note that the operation of Dijkstra's algorithm is not described herein since it is known in the art. In one embodiment, the GGS module 107 applies Dijkstra's algorithm to multiple random samples of station node groups in the time independent graph. The application of Dijkstra's algorithm results in a shortest path tree for each application of the algorithm.

The GGS module 107 determines scores 519 for each station node group in the trees resulting from Dijkstra's algorithm. In one embodiment, the GGS module 107 assigns a given station node group a score based on the number of station node groups in the sub-tree that are below the given station node group that is being scored. The GGS module 107 generates a total score for each station node group by summing the scores of each station node group from the different trees resulting from the applications of Dijkstra's algorithm.

Once a total score for each station node group has been generated, the GGS module 107 selects 521 global stations based on the total scores. In one embodiment, the GGS module 107 selects only a small percentage of station node groups. The GGS module 107 arranges the global stations in descending order based on the total scores and selects the top one percent of the global stations thus resulting in a set of global stations 503.

3. Pre-Compute Direct Connection Information

Referring back to FIG. 2, in the third stage of the pre-computation process, the direct connection module 113 pre-computes 203 direct connection information using the transit graph. In one embodiment, a direct connection trip is a trip from a source station to a target station with no transfers. Although a trip may include stops at intermediate stations between the source station and the target station, as long as a transfer does not occur at an intermediate station, the trip is considered a direct connection trip. In terms of the transit graph, a direct connection trip is a trip with no transfers that departs from a station node in the transit graph and arrives at an onboard node associated with the target station in the transit graph.

Figure 6:
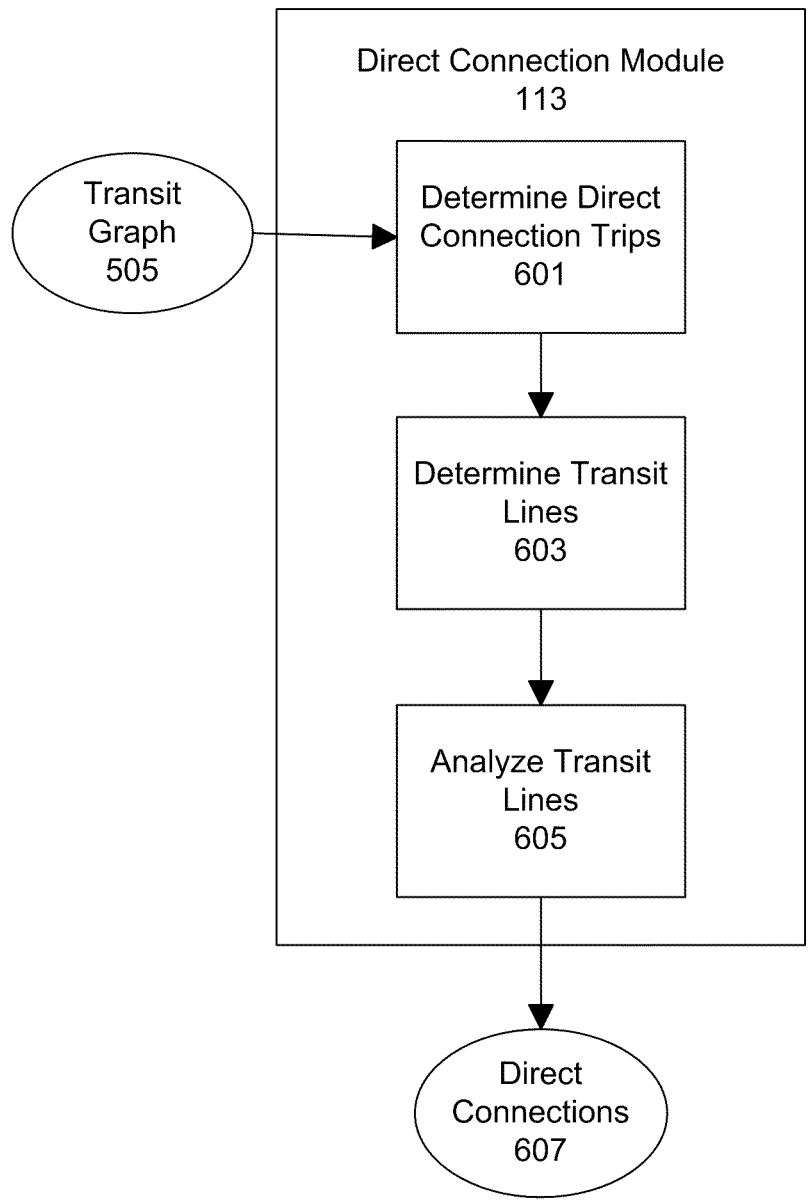
FIG. 6 is a process flow diagram for determining direct connections according to one embodiment.

Referring now to FIG. 6, there is shown a flow diagram of a method for computing direct connection information performed by the direct connection module 113. In one embodiment, the direct connection module 113 takes as input the transit graph FIG. 505. The direct connection module 113 determines 601 (i.e., explores) the transit graph and identifies trips. That is, the direct connection module 113 identifies paths in the transit graph that represent a single transit vehicle travelling across a set of stations at given times of the day. Since only a single vehicle is used in the journey, it implies that the journey is a direct trip.

The direct connection module 113 then determines 603 transit lines. In one embodiment, a transit line is a set of trips connecting a source station and a target station where each trip in the line goes through the same stations in the same order or sequence. That is, each trip in the transit line has the same source station, target station and set of intermediate stations located between the source station and the target station where stops are made by a transit vehicle associated with the trip. In one embodiment, each trip in a transit line also has the same penalty. Thus, even if two trips have the same source station and target station and go through the same stations in the same order, if the penalty of the two trips is different then the trips would not be included in the same transit line. Note that a trip in a transit line may only include the source station and target station if no stop is made at an intermediate station. The trips in the transit line are distinguished from one another based on the arrival/departure times from the source station, departure station, and/or intermediate stations where stops are made along the trip.

In one embodiment, for each trip in the transit line, the direct connection module 113 associates a point nature to each station in the trip. Each station is considered a point along the trip and the point nature describes the event that occurs at that point. The direct connection module 113 assigns a point nature of "boarding point" for each station node and assigns a point nature of "alighting point" for each onboard node. The direct connection module 113 then assigns a point index to each node and sorts the trip in a canonical order using the points associated with each node based on two properties:

1. There is no path from a point in the trip with a higher index to a point with a lower index.
2. There is always a path from a boarding point with a lower index to an alighting point with a higher index.

In one embodiment, the direct connection module 113 also assigns a cumulative penalty to each node. The cumulative penalty describes the total penalty between a boarding point and an alighting point on the trip. The cumulative penalty is added to each node in order to circumvent the need to analyze each arc connecting a pair of nodes to determine the penalty between the nodes. Rather, the direct connection module 113 can determine the cumulative penalty by subtracting the cumulative penalty at the boarding point from the cumulative penalty at the alighting point. Once the direct connection module 113 has included the information described above to the trip, the trip information is stored. Thus, each node in the transit graph that is associated with a direct connection trip would correspond to a unique triple. Each triple includes the line ID describing the transit line associated with the node, a trip ID describing the trip from the transit line, and a point index.

Figure 7:
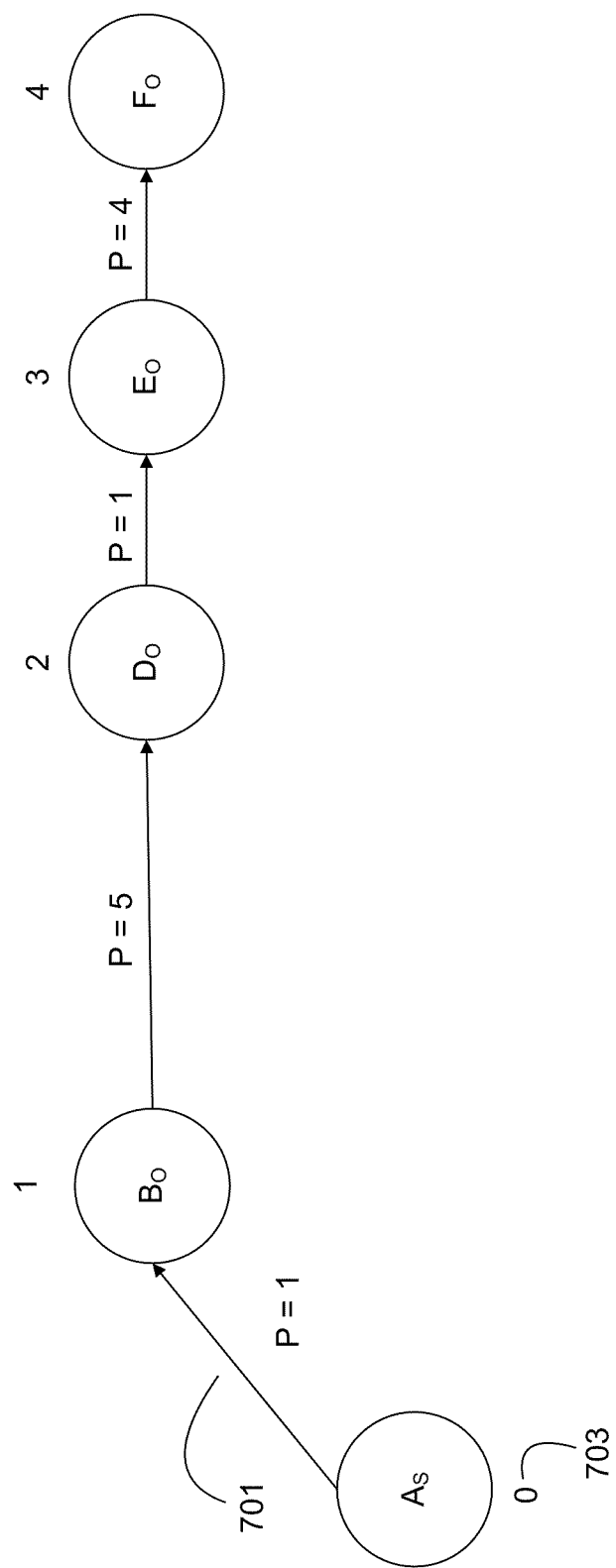
FIG. 7 illustrates an example of a direct connection trip according to one embodiment.

Referring now to FIG. 7, there is shown an example representation of a transit line that includes a station node (e.g., $A_S$) representing the source station and a plurality of onboard nodes (e.g., $B_O$, $D_O$, $E_O$, and $F_O$) that are connected by arcs 701. Each node is associated with a point index 703 that has been assigned by the direct connection module 113. FIG. 7 also illustrates a penalty assigned to each arc that describes the penalty between the nodes connected by the arc. A direct connection table is shown below that includes information about the optimal trip. The transit line illustrates the storage architecture of the direct connection trips in the direct connection database 125.

| | Example of a Transit Line | | | | |
|---|---|---|---|---|---|
| | TGraph Station ID | | | | |
| | A | B | D | E | F |
| Point Index | 0 | 1 | 2 | 3 | 4 |
| Point Nature | Boarding | Alighting | Alighting | Alighting | Alighting |
| Cumulative Penalty | 0 | 1 | 6 | 7 | 11 |
| Times of Trip 23 | 8:00 | 8:15 | 8:30 | 9:45 | 10:00 |
| Times of Trip 55 | 9:00 | 9:15 | 9:30 | 9:50 | 10:15 |
| Times of Trip 60 | 11:00 | 11:15 | 12:00 | 12:30 | 13:00 |

-continued

Example of a Transit Line

| | TGraph Station ID | | | | |
|---|---|---|---|---|---|
| | A | B | D | E | F |
| Times of Trip 100 | 11:30 | 12:00 | 13:00 | 13:15 | 13:30 |
| Times of Trip 18 | 12:00 | 12:15 | 12:45 | 13:00 | 15:00 |

Once all transit lines have been determined from the transit graph, the direct connection module 113 analyzes 605 the transit lines. The direct connection module 113 determines from the transit lines a direct connection table. The direct connection table is a list of ordered pairs of stations and a set of lines for each pair that describes boarding at a source station in the pair and alighting at a target station in the pair. Generally, the direct connection module 113 determines direct connections 607 for the possible pairs of stations in the transit graph. Below is an example of a direct connection table.

Example of a Direct Connection Table

| Station Pair | Line IDs |
|---|---|
| (A, B) | $L_1, L_4, L_5,$ and $L_9$ |
| (A, C) | $L_2$ and $L_3$ |
| (B, A) | N/A |
| (B, C) | $L_4, L_5,$ and $L_9$ |
| ... | ... |

The example direct connection table above illustrates a list of station pairs and each pair's list of line IDs that indicate transit lines that comprise trips from the source station to the target station in the pair. For example, station pair (A, B) has associated line IDs of $L_1, L_4, L_5,$ and $L_2$. This indicates that the transit lines associated with these line IDs have trips that allow a person to board station A and alight at station B. As another example, consider station pair (B, A) which has no trips where a person can board station B and alight at station A.

4. Transfer Pattern Computation

Referring back to FIG. 2, in the fourth stage of the pre-computation process, the transfer pattern computation (TPC) module 109 computes 205 optimal transfer patterns. As previously mentioned, a transfer pattern of a journey describes the sequence of transit vehicle transfers at one or more stations that need to be made in order to reach the destination of the journey. The optimal transfer patterns describe the routes to reach a target station from a source station with minimal cost. Note that the optimal transfer pattern is the transfer pattern of a journey that is optimal at some particular time and for some cost metric. Thus, different journeys following different transfer patterns may be optimal at different times of the day and depending on whether optimization is based on duration of transit, amount of walking, number of transfers, or other metrics. In one embodiment, the TPC module 109 computes transfer patterns according to three different embodiments: exact transfer pattern computation without global stations, exact transfer pattern computation with global stations, and heuristic transfer pattern computation with global stations. Each embodiment will be described herein.

A. Exact Transfer Pattern Computation without Global Stations

Figure 8:
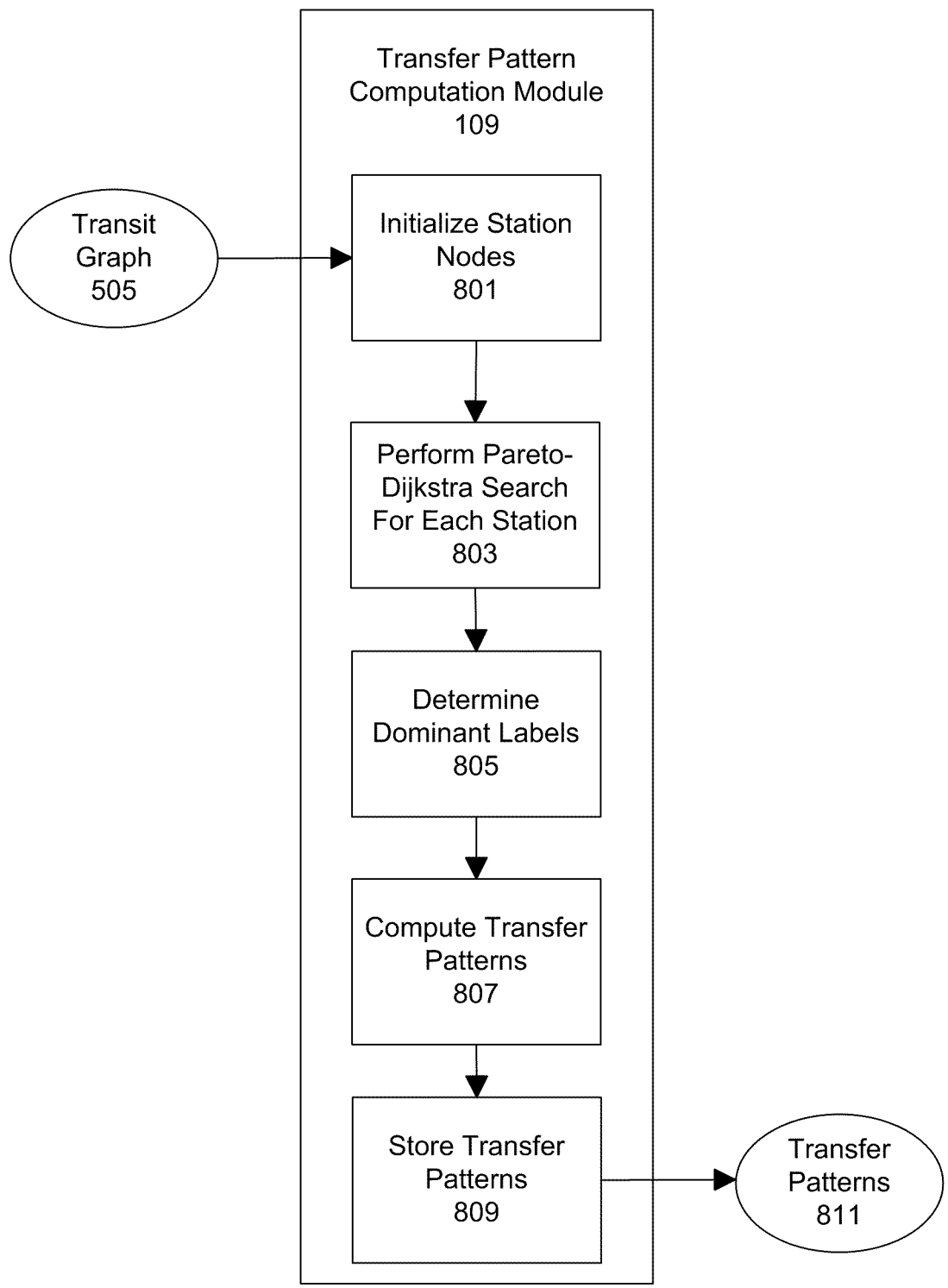
FIG. 8 is a process flow diagram for computing transfer patterns without using global stations according to one embodiment.

In one embodiment, the TPC module 109 computes transfer patterns without making use of global stations. Referring now to FIG. 8, there is shown a flow diagram of a method performed by the TPC module 109 to compute optimal transfer patterns 811 according to this embodiment. In one embodiment, the method shown in FIG. 8 is performed for each station to all other stations, to determine optimal transfer patterns between each pair of stations. For ease of discussion, the method is described with reference to a starting (i.e., source) station and a target station.

In one embodiment, the TPC module 109 takes the transit graph FIG. 505 as input. The TPC module 109 initializes 801 all of the station nodes of the source station in the transit graph. That is, the TPC module 109 assigns a label with a zero cost to every station node of the source station. Thus, each station node has a duration of zero and a penalty of zero listed in its label. As previously mentioned, each station node of the station represents different departure times from the station.

Once the station nodes have been initialized, the TPC module 109 performs 803 a Pareto-Dijkstra search from each station node from the starting location to each node at the target station. In one embodiment, a Pareto-Dijkstra search is an exploration of a graph that is similar to a Dijkstra search except that the TPC module 109 tags nodes with a multi-dimensional label such as (penalty, duration) instead of a single cost typical to Dijkstra's algorithm. A Pareto-Dijkstra search maintains for every node, a set of pareto-optimal labels. In Dijkstra, there is only one optimal cost, whereas having multi-dimensional labels in a Pareto-Dijkstra search yields many potential optimal labels. For example, consider the label set resulting from a Pareto-Dijkstra search where the set includes {(penalty=3, duration=10), (penalty=5, duration=7), and (penalty=8, duration=2)}. In this example, all the labels are considered optimal since no label is strictly better than another in terms of the multi-dimensional cost.

As a result of the Pareto-Dijkstra search, the TPC module 109 provides an optimal route from each source node leading to a particular target node at the target station. Each route may include various stations where a transfer occurs between the source station and target station. In one embodiment, each node in the route has a corresponding label set specifying a cost in terms of penalty and duration. The TPC module 109 assigns the labels in the label set based on the costs associated with the arcs in the route as described by the transit graph.

For each station, the TPC module 109 determines 805 the dominant labels. In one embodiment, after a Pareto-Dijkstra search has been completed, each node in the transit graph is associated with a set of optimal labels. The TPC module 109 determines the optimal paths by backtracking from the labels at target station to the source station from which the optimal labels were determined.

In one embodiment, the TPC module 109 relaxes the label sets at each onboard node. According to one embodiment, relaxation of the label sets comprises the TPC module 109 propagating labels from one label set into other label sets that keep their pareto optimality. That is, when adding labels from a first label set to a second label set, labels that are dominated in all cost dimensions by other labels are removed (i.e., filtered) from the second label set. In one embodiment, the TPC module 109 determines that a cost pair (d1, p1) for path 1 dominates cost pair (d2, p2) for path 2 if the following condition is met:

$$d1 \leq d2 \text{ and } p1 \leq p2$$

The TPC module A109 determines that the cost pair for path 1 dominates the cost pair for path 2 if the duration of path 1 is less than or equal to the duration of path 2 and the penalty of path 1 is less than or equal to the penalty of path 2. In other words, path 1 dominates path 2 if path 1 is better than path 2 in all dimensions of cost. For example, if path 1 has a duration of 3600 seconds and a penalty of 100 while path 2 has a duration of 5400 seconds and a penalty of 200, path 1 dominates path 2 in terms of both duration and penalty. Thus, relaxation of a label set prevents the second label set from increasing in the number by removing the dominated labels. Rather, each label set is reduced in the number of labels using relaxation. The labels remaining in the label set after relaxation are considered the dominant labels. In one embodiment, if two labels are equal in terms of duration and penalty, the label with the earlier arrival time dominates.

For example, consider the onboard nodes at station A. The TPC module 109 relaxes the label set at each onboard node at station A by propagating the label sets along virtual waiting arcs. For instance, the TPC module 109 propagates a label (penalty=100, duration=600) of an onboard node at station A at time "T" to all onboard nodes at the same station A. That is, another onboard node at A at time "T+dt" receives the label (penalty=100, duration=600+dt). The TPC module 109 then removes labels in the label set at each onboard node that are dominated by other labels based on the domination factor described above. In one embodiment, the label sets at station nodes are relaxed to the onboard nodes in a similar manner as described above.

Once the dominant labels have been determined, the TPC module 109 computes 807 the optimal transfer patterns by backtracking the optimal paths from each dominant label remaining in each onboard node back to the source node from which the search was performed. The TPC module 109 also may determine the transfer patterns for each optimal path as the path is being determined. That is, the TPC module 109 analyzes the nodes indicated in each optimal path and determines which nodes are associated with transit vehicle transfers. Since each node is associated with a particular station, the TPC module 109 can extract the transfer pattern from the path based on the nodes in which a transfer occurred.

An example of determining a transfer pattern from an optimal path is as follows. Consider a Pareto-Dijkstra search from station A that returned optimal paths to station F. One of the returned optimal paths is a sequence of nodes associated with a sequence of stations ABDEF. The TPC module 109 analyzes the information associated with each node in the path and determines transfers occurred at stations B and E. Thus, in this example, the TPC module 109 extracts the transfer pattern of ABEF from the path.

Once the transfer patterns are determined, the TPC module 109 stores 809 the transfer patterns for later use. In one embodiment, the dominant labels are discarded when the transfer pattern computation for each station is completed.

B. Exact Transfer Pattern Computation with Global Stations

In one embodiment, the TPC module 109 computes transfer patterns using the global stations determined by the global station selection module 107. To determine optimal transfer patterns from the transit graph, the TPC module 109 performs a single global search for each global station determined by the GSS module 107. In one embodiment, a global search is a Pareto-Dijkstra search from a global station in the transit graph to determine paths to all other nodes reachable from the global station in the transit graph. That is, the TPC module 109 performs a full graph exploration from each global station to determine the optimal way to reach each other station in the transit graph. In one embodiment, there are one or more optimal ways to reach a station in the transit graph from a global station based on different criteria such as time duration of a trip and penalty.

Figure 9:
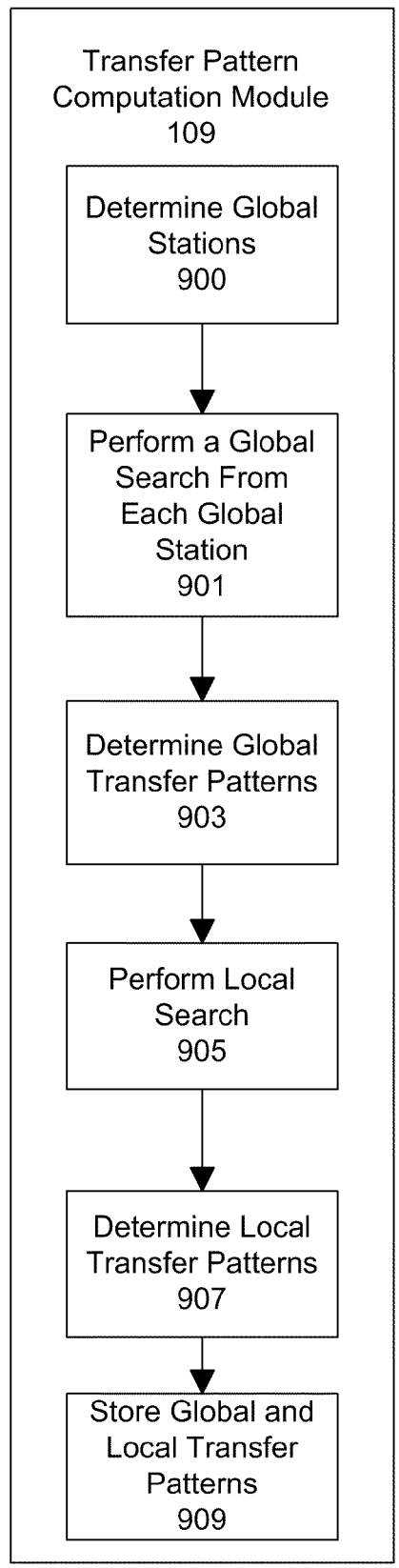
FIG. 9 is a process flow diagram for computing transfer patterns with global stations according to one embodiment.

Referring now to FIG. 9, there is shown a method performed by the TPC module 109 to determine transfer patterns according to this approach. The TPC module 109 determines 900 all global stations from the route information database 125. Generally, for each global station, the TPC module 109 performs 901 a single global search from the global station. Specifically, the TPC module 109 performs a single Dijkstra search in the transit graph from all nodes (station and onboard) of each global station to determine optimal paths to every other node in the transit graph that can be reached from the global station. In a global search, all nodes of the global station are initialized with a cost of zero in both the duration and penalty dimension.

For each optimal path returned as a result of the global search from a global station in the transit graph, the TPC module 109 determines 903 the global transfer patterns from the returned paths. In one embodiment, global transfer patterns are transfer patterns resulting from a global search. The TPC module 109 determines the global transfer patterns by analyzing the nodes indicated in each returned path and determining which nodes are associated with transit vehicle transfers. Since each node is associated with a particular station, the TPC module 109 can extract the transfer pattern from the path based on the nodes in which a transfer occurred as discussed above in the discussion related to transfer pattern computation without the use of global stations.

Once the global transfer patterns are determined, the TPC module 109 performs 905 a local search in order to determine local transfer patterns. In one embodiment, a local search is a search from station nodes of a non-global station (i.e., a local station) based on criteria. In one embodiment, the criteria is to explore the transit graph to determine the shortest paths from the station nodes of local stations to other stations in the transit graph where the shortest paths do not describe a transfer at a global station in the path. That is, the TPC module 109 performs a search from each station node of a local station to determine the optimal paths to each other station in the transit graph.

The TPC module 109 then determines 907 the local transfer patterns from the optimal paths. Generally, a local transfer pattern is a transfer pattern resulting from a local search. The TPC module 109 analyzes the nodes indicated in each returned path and determines which nodes are associated with transit vehicle transfers. As mentioned above, since each node is associated with a particular station, the TPC module 109 can extract the transfer pattern from the path based on the nodes in which a transfer occurred.

The TPC module 109 then further analyzes each extracted transfer pattern to determine whether the transfer pattern includes a passive portion. In one embodiment, the passive portion of a transfer pattern is the series of stations following a transfer at a global station in the transfer pattern. That is, if the transfer pattern indicates that a transfer occurred at a global station, the sequence of remaining stations in the transfer pattern is considered the passive portion of the transfer pattern. The portion of the transfer pattern that starts at the source station and ends at the global station in which a transfer occurred is considered the active portion of the transfer pattern. According to one embodiment, the active portion of the transfer pattern includes the global station. In one embodiment, the global station included in the transfer pattern is considered an access station of the local station from which the local search was performed. An access station is essentially a global station that is associated with a local station and allows a transit vehicle from that local station to reach a target station that would have otherwise been unreachable without the access station. Thus, each local station comprises one or more access stations resulting from the determination of the local transfer patterns. Note that a local transfer pattern need not have a passive portion. If a transfer does not occur at a global station in the local transfer pattern or if the last station in the local transfer pattern is a global station, the entire local transfer pattern is considered to be active.

Once the local transfer patterns are determined, the TPC module 109 stores 909 the global transfer patterns and local transfer patterns in the route information database 125. In one embodiment, only the active portion of each local transfer pattern is stored.

C. Heuristic Transfer Pattern Computation with Global Stations

In one embodiment, the TPC module 109 computes transfer patterns of the transit graph using the global stations determined by the global station selection module 107 based on various heuristics or approaches. In one embodiment, the following approaches are used by the TPC module 109 to compute transfer patterns with global stations:

i. Duration relaxed by penalty
  ii. Stop local searches after a number of transfers
  iii. Stop local search onboard a global station
  iv. Use a subset of transfer patterns to account for all optimal trips
  v. Prune with initial and final walking Each approach is described in further detail below.

i. Duration Relaxed by Penalty

Figures 10A, 10B:
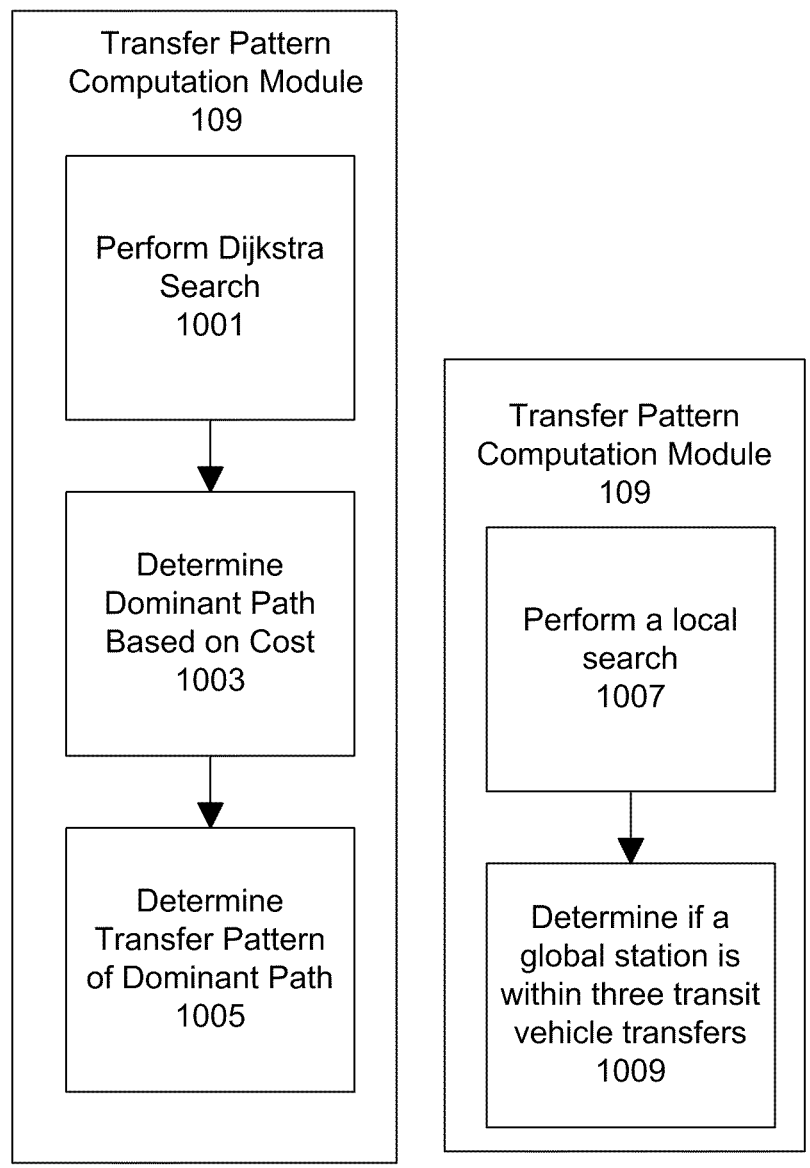

Referring now to FIG. 10A, there is shown a method performed by the TPC module 109 to determine transfer patterns based on costs of paths. The following description will be described with respect to a source station and a target station. In one embodiment, either the source station or target station is a global station. In one embodiment, the process described below is repeated by the TPC module 109 for every possible source station in the transit graph. The TPC module 109 thereby determines a dominant path for every source station from the transit graph and results in a set of transfer patterns for each source station.

First, the TPC module 109 performs a Pareto-Dijkstra search 1001 on the transit graph from the source station. For each node at the source station, a Pareto-Dijkstra search is performed that results in paths to a node at each possible target station. Thus, the Dijkstra search results in a plurality of optimal paths from the source station to each target station.

As a part of the Dijkstra search, the TPC module 109 determines 1003 a dominant path from among the paths resulting during the Dijkstra search based on cost. The TPC module 109 analyzes the cumulative cost of a pair of paths to determine which path is dominant. In one embodiment, a dominant path has the lowest cost in terms of duration and penalty compared to the costs of all the other paths resulting from the search.

According to one embodiment, the TPC module 109 determines during the Pareto-Dijkstra search that a cost pair (d1, p1) for path 1 dominates cost pair (d2, p2) for path 2 if the following conditions are met:

1. $d1 \leq d2$ and $p1 \leq p2$ or

2. $d1 < d2$ and $p1 \geq p2$ and $[d1+A*(p1-p2)] \leq d2$ where $A=8$

In the first condition, as previously described above the TPC module 109 determines that the cost pair for path 1 dominates the cost pair for path 2 if the duration of path 1 is less than or equal to the duration of path 2. Additionally, in order for the cost pair for path 1 to dominate the cost pair for path 2, the penalty of path 1 must be less than or equal to the penalty of path 2.

If the TPC module 109 determines that the duration of path 1 is less than to the duration of path 2, but the penalty of path 1 is greater than or equal to path 2, the TPC module 109 performs a computation based on the summation of the duration of path 1 with the difference of the penalty of path 1 and path 2 multiplied by a weighting factor A. In one embodiment shown above $A=8$. However, in alternative embodiments different values can be used. If the result of the computation is less than or equal to the duration of path 2, then the TPC module 109 determines that path 1 dominates path 2. As an example, assume that path 1 has a duration of 3600 seconds and a penalty of 500 while path 2 has a duration of 4000 seconds an a penalty of 100. In this example, condition 2 applies because the duration of path 1 is less than the duration of path 2, but the penalty of path 1 is greater than the penalty of path 2. To determine the dominant path, the formula for condition 2 is used. Using the formula above, path 1 does not dominate path 2 because [3600+8*(500−100)] is equal to 4400 which is not less than or equal to the duration of path 2. Thus, path 1 in this example does not dominate path 2. Once the dominant path is determined, the TPC module 109 determines 1005 the transfer pattern of the dominant path.

Since the process described above is repeated for every possible source station in the transit graph, the TPC module 109 results in a set of optimal transfer patterns that are then stored.

ii. Stop Local Searches after a Number of Transfers

Referring now to FIG. 10B, there is shown a method performed by the TPC module 109 to determine transfer patterns to a global station based on the heuristic that in highly populated areas, a route for a trip generally arrives at a global station with minimal number of transfers and that in rural areas there are few stations where a transfer takes place among a large number of stations. In one embodiment, this heuristic operates under the condition that a trip must reach a global station within two transit vehicle transfers (i.e., three transit vehicles are used during the trip). In other embodiments, different numbers of transfers can be used.

To determine a transfer pattern to a global station, the TPC module 109 performs 1007 a local search from a given starting node in the transit graph. As described above, a local search is a search from a station node at a local station to determine optimal paths to other stations in the transit graph. The TPC module 109 traces the shortest paths in the transit graph beginning from the starting node and radiating out to other nodes in the transit graph. The TPC module 109 determines 1009 from the path if a global station is reached within two transit vehicle transfers starting from the starting node. Specifically, beginning from the starting node, for each subsequent node along the route in the transit graph, the TPC module 109 determines if a transfer occurs or if the station associated with the node is a global station. If at most two transfers occur before reaching a global station, the path of stations that led to the global station is considered a transfer pattern.

For example, assume a starting node at a local station A in the transit graph that is included in a path where the first global station along the path is station G. The node at station A is connected by a series of nodes representing the path of ABCDEFG. Assume that no transfers occur from station A to station G. Starting from station A, the TPC module 109 traces the path and determines whether each subsequent station is a global station or if a transfer occurred at the subsequent station. In this example, since no transfer occurs between stations A and G, the TPC module 109 stops traversing the path once it reaches station G. Thus, the transfer pattern for path ABCDEFG is AG indicating that no transfers occurred between stations A and G.

If a transfer occurs at a non-global station, the TPC module 109 tracks the occurrence of the transfer and repeats the process until either a global station is reached in the path or the third transfer at a non-global station occurs. If the TPC module 109 determines that a global station is reached within two transfers, the transfer pattern associated with the path is determined. If the TPC module 109 determines that a global station is not reached after a maximum of two transfers or at the third transfer, the path under analysis is ignored and the TPC module 109 repeats the process described above for another non-global station. The TPC module 109 performs the analysis for each node at every non-global station in the transit graph to determine the set of transfer patterns to a global station.

As an example, consider the path of ABCDEFG used above and assume that G is a global station and a transit vehicle transfer occurs at C and F. Starting from station A, the TPC module 109 determines whether each subsequent station is a global station or if a transfer occurred at the subsequent station. Since a transfer occurs at station C, the TPC module 109 tracks the transfer. Since only a second transfer occurs at station F prior to reaching global station G, the TPC module 109 considers the path ACFG as a transfer pattern from source station A to global station G.

Now assume that transfers occur at stations B, C, and F. In this example, since three transit vehicle transfers occur before reaching global station G, the TPC module 109 stops expanding the path to global station G once the third transfer is reached. Generally, by halting the expansion of the path at the third transfer, the TPC module 109 removes many paths from consideration and makes the pre-computation of optimal paths substantially faster.

Since the process described above is repeated for every pair wise combination of local stations and global stations in the transit graph, the TPC module 109 results in a set of transfer patterns which are then stored.

iii. Stop Local Search Onboard a Global Station

Referring now to FIG. 10C, there is shown a method performed by the TPC module 109 to determine transfer patterns from local stations to global stations. Note that for ease of discussion, the following description is discussed in reference to the determination of a transfer pattern from a single node in the transit graph. It will be apparent to one skilled in the art that the following discussion can be repeated for every station node at a local station in the transit graph to determine transfer patterns to global stations.

In one embodiment, the TPC module 109 performs 1011 a local search from a given station node of a local station. The TPC module 109 traces the path in the transit graph that begins from the station node and radiates out to other nodes in the transit graph. The TPC module 109 determines 1013 from the path when an onboard node at a global station is reached. More specifically, beginning from the station node, for each subsequent node along the path in the transit graph, the TPC module 109 determines if the next subsequent node in the transit graph is an onboard node associated with a global station. Once an onboard node at a global station is reached, the TPC module 109 determines 1015 the transfer pattern of the path (including the station node) that lead to the onboard node at the global station. In one embodiment, stitching, as will be further described below, is required to account for a journey that does not stop at the global station.

For example, consider the path ABCDEFG from local station A to global station G described above with transfers at stations C and D. Assume that the node associated with station G in the path is an onboard node. The TPC module 109 traverses the path until an onboard node associated with a global station is reached. Thus, in this case the path of ACDG is considered a transfer pattern since station G is the first onboard node of a global station that is reached in the path. If no transfers occur between stations A and G, the transfer pattern for the path would be AG signifying that a transfer does not occur. As noted above, transfer patterns include the starting and target stations of a trip.

As another example, assume that station E is also a global station and the node associated with station D in the path is an onboard node. In this case, the TPC module 109 traverses the path until the first onboard node of a global station is reached which in this case is station D rather than the onboard node at station G. Thus, a transfer pattern of ACDE is generated.

Since the process described above is repeated for every pair wise combination of local stations and global stations in the transit graph, the TPC module 109 results in a set of transfer patterns which are then stored.

iv. Use a Subset of Transfer Patterns to Account for all Optimal Trips

Referring now to FIG. 10D, there is shown a method performed by the TPC module 109 to determine transfer patterns from all stations in the transit graph. The approach shown in FIG. 10D is used to reduce the number of trips from a source station to a target station. In general, the following approach is used to replace the set of all transfer patterns of optimal trips to a target station by a subset that is sufficient to cover all optimal trips to the target station. In one embodiment, for every station pair in the transit graph, the description below is repeated to determine transfer patterns between the stations.

In one embodiment, the TPC module 109 performs 1017 a local search from each node of a source station (i.e. source station) to a node at a target station in the transit graph. From the search, the TPC module 109 results in a set of optimal paths from the source station to the target station at various departure times from the source station. The TPC module 109 determines 1019 a transfer pattern from the source station to the target station for each optimal path returned from the search thus forming a set of optimal transfer patterns. The set of optimal transfer patterns is said to cover all possible trips from the source station to the target station for a particular day.

The TPC module 109 then determines 1021 redundant trips that are implied by the transfer patterns in the set. That is, for each transfer pattern that represents a trip from a source station to a target station, the TPC module 109 determines other transfer patterns from the same source station to target station. The TPC module 109 determines if one of the transfer patterns is able to cover the trip of the source station to the target station to eliminate the need to keep both transfer patterns. In one embodiment, one or more transfer patterns cover a trip at time T, if for each service day of the trip, a second trip at time T' exists that has a transfer pattern from the determined set with an identical transfer pattern such that the second trip does not depart from the starting location earlier than the first trip and has a cost that exceeds the cost of the first trip by no more than a threshold.

For example, consider the scenario for a given trip where there are many optimal trips throughout the day with a transfer pattern of ABC for the trip. Among those optimal trips is a trip that departs station A at 22:40 and arrives at station C at 23:25 with a penalty of 200. Additionally, there is an odd one-off trip with a transfer pattern of ADC. The one-off trip departs from station A at 22:38 and arrives at station C at 23:22 and has a penalty of 180. Even though the one-off trip is a better result for a user who wants to depart at 22:38, the one-off trip is dismissed in favor for the trip associated with transfer pattern ABC because it provides a trip that can be taken whenever the dismissed trip could be taken since it departs from the same source station at a later time. Additionally, the worst cost of the trip with transfer pattern ABC (i.e., a later arrival time of 3 minutes and an extra penalty of 20) is below the threshold.

v. Prune with Initial and Final Walking

In one embodiment, the TPC module 109 uses the initial and walking heuristic to remove paths between stations that seem optimal, but are non-optimal during query time when multiple stations nearby the starting and destination locations are considered by the transit server 100. As an example, consider bus stations A and B that are 400 meters apart and are not served by the same bus line. Because of this heuristic, at query time, walking from A to B is determined to be optimal. However, without the heuristic, the optimum result from a local search from station A is a trip that leaves from station A and reaches station B via a lengthy detour at station C. Thus, this heuristic allows the TPC module 109 to prune the transit trip from A to B since it is optimal to simply walk from station A to station B.

Figure 10E:
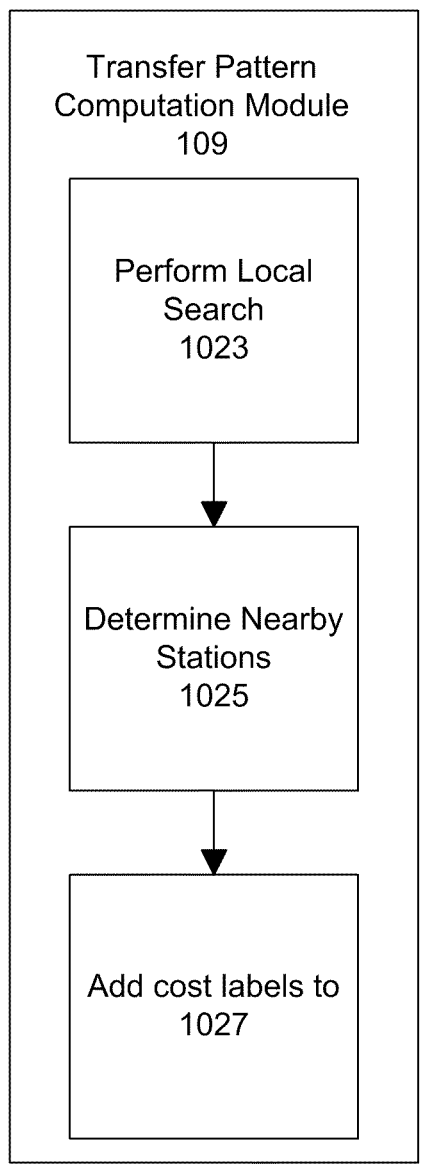

Referring now FIG. 10E, there is shown a method performed by the TPC module 109 to determine the cost of walking from a local source station to a nearby local station. Note that the process described below is repeated for each local station in the transit graph to determine transfer patterns. In one embodiment, the TPC module 109 performs 1023 a local search from a given local station. From the local search, the TPC module 109 determines 1025 all stations nearby the local station. In one embodiment, the TPC module 109 determines nearby stations up to a radial distance, such as one mile. For each nearby station, the TPC module 109 adds 1027 cost labels. Specifically, for each station node at the nearby station, the TPC module 109 adds a cost label that is equivalent to the cost of walking from the transit station in which the search was performed to the nearby station. In one embodiment, the cost of walking describes an estimated amount of time it takes to walk from the transit station to the nearby station.

For example, assume a local station A. The TPC module 109 performs a local search from station A to determine all nearby stations that are within a two mile radius. The search results in a list of stations M, K, and G that are within the two mile radius of station A. The TPC module 109 then adds a label to each of the nearby stations that indicates the cost of walking from station A to the nearby station. For example, assume that on average it takes a person 1800 seconds (0.5 hour) to walk from station A to station M. The TPC module 109 would add a label to station M indicating a cost of 1800 seconds.

In one embodiment, the TPC module 109 performs a similar process described above for each global station. For a given global station, the TPC module 109 performs a global search to determine all nearby stations in the transit graph that are reachable from the global station. For each nearby station, the TPC module 109 adds a cost to the station nodes of the nearby station. In one embodiment, the TPC module 109 adds a penalty at the global station based on a transfer penalty associated with the node and a walking cost.

Figure 10F:
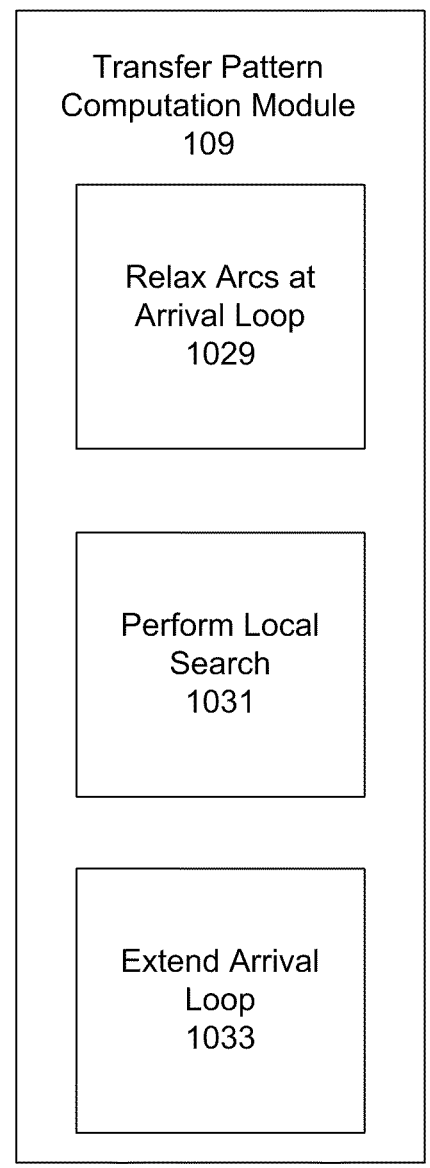

Referring now to FIG. 10F, there is shown a method performed by the TPC module 109 to determine the cost of walking from a nearby station to a target station. For example, for a given trip from a source station to a target station, rather than travelling from the source station to the target station directly, it may be optimal to transit from the source station to a station nearby the target station and walk from the nearby station to the target station.

In one embodiment, the target station for a trip comprises an arrival loop. An arrival loop is a copy of the target station's onboard nodes and their labels connected by arcs. The TPC module 109 relaxes 1029 the arcs at the arrival loop which removes the labels of the trips that are optimal at their respective onboard node, but are not actually optimal because there is a better trip in terms of cost that arrives earlier.

The TPC module 109 then performs a local search 1031 at the target station to determine stations that are nearby. The TPC module 109 extends 1033 the arrival loop of the target station by adding arcs from the onboard nodes of the nearby stations to the station node of the target station. In one embodiment, the arcs represent walking arcs that describe walking from the nearby station to the target station.

By repeating the process described above for each local station, the TPC module 109 results in a set of transfer patterns which are then stored.

5. Transfer Pattern Compression

In one embodiment, the last phase of the pre-computation process is optional. The transfer pattern compression module 111 compresses the transfer patterns determined by the TPC module 109 for efficient storage purposes rather than saving the complete transfer pattern as previously described above. Generally, the transfer pattern compression module 111 segments each transfer pattern into smaller parts. By compressing the transfer patterns, the transfer patterns are generally broken down into smaller pieces that, because of their size, have a high redundancy and may be compressed in an efficient manner which allows storage of the pieces more efficiently.

Figure 11:
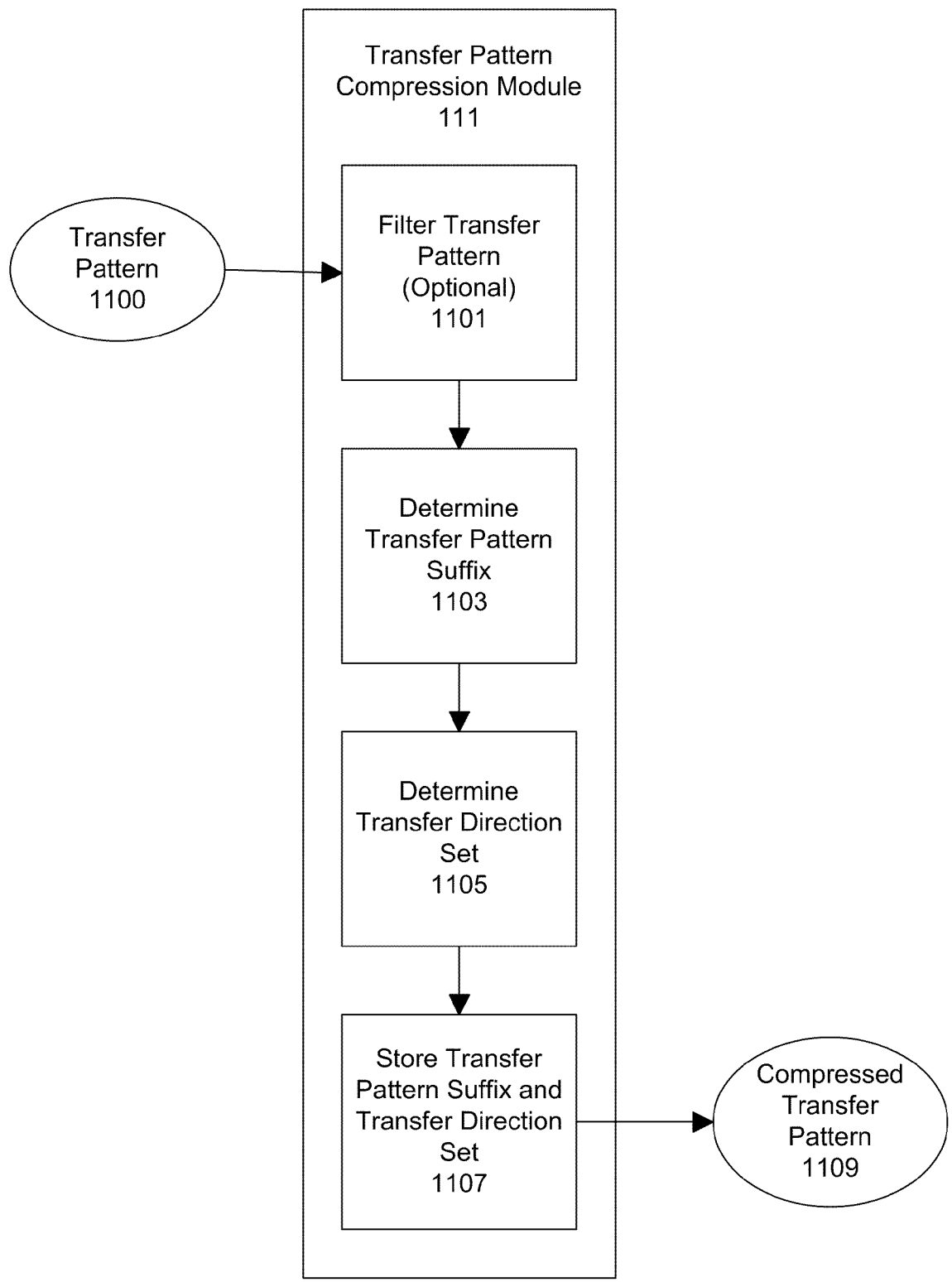
FIG. 11 is a process flow diagram for compressing transfer patterns according to one embodiment.

Referring now to FIG. 11, there is shown a process flow performed by the transfer pattern compression module 111 to compress transfer patterns. The process described below is repeated for every transfer pattern determined by the TPC module 109 described above.

In one embodiment, the transfer pattern compression module 111 takes as input a transfer pattern 1100. The transfer pattern compression module 111 optionally filters 1101 the transfer pattern to replace each repetitive sequence of stations in the transfer pattern with a single instance of the station. For example, consider the following transfer pattern of a journey: board at Station A, arrive at station B, board at station B, arrive at station C, board at station D, and arrive at station F. In other words, the transfer pattern of the journey is ABBCDF. All boarding events in the transfer pattern represent station nodes from the transit graph and all arrival events represent onboard nodes in the transit graph. In this example, the transfer pattern compression module 111 determines that station B is repetitive and replaces the sequence "BB" with the single instance "B". The transfer pattern compression module 111 essentially does not distinguish between station or onboard nodes. Thus, the resulting pattern becomes ABCDF rather than ABBCDF. In alternative embodiments, the transfer pattern is not filtered to remove repetitive sequences of stations in transfer patterns.

Regardless of whether the transfer pattern is filtered, the transfer pattern compression module 111 determines 1103 transfer a pattern suffix for a given station in the transfer pattern. In one embodiment, a transfer pattern suffix describes a sequence of two stations in the transfer pattern that preceded the station associated with the suffix. Essentially, each station within the transfer pattern except for any station not being proceeded by two stations can be considered a target station and thereby have an associated transfer suffix. Thus, for each station in a transfer pattern that is proceeded by two stations, the transfer pattern compression module 111 determines 1105 a transfer pattern suffix that describes the two stations in the transfer pattern that preceded the station associated with the suffix. The transfer pattern suffixes from a source station to a target station are considered a transfer pattern suffix set for the pattern. Once the transfer pattern suffixes are determined, the transfer pattern compression module 111 stores 1107 each transfer pattern suffix and its associated station resulting in a compressed transfer pattern 1109. By storing the transfer pattern in this manner, the transfer pattern compression module 111 stores segments of the transfer pattern.

An example of the storage scheme for the compressed transfer pattern of ABCDF described above is shown below.

| Transfer Pattern Suffix | Station |
|---|---|
| {C, D} | F |
| {B, C} | D |
| {A, B} | C |

As shown above, the stations of the transfer pattern ABCDF that have an associated transfer pattern suffix are F, D, and C. The transfer pattern suffix describes the sequence of two stations in the transfer pattern used to arrive at the associated station. The collection of transfer pattern suffixes shown above is considered the transfer pattern suffix set for source station A and target station F. Although this scheme loses the actual transfer patterns, the transfer pattern from station A to F can be reconstructed from the storage scheme shown above.

As a further example, given a transfer pattern of QYGLMKR, an example of the storage scheme for the compressed transfer pattern of QYGLMKR is shown below.

| Transfer Pattern Suffix | Station |
|---|---|
| {M, K} | R |
| {L, M} | K |
| {G, L} | M |
| {Y, G} | L |
| {Q, Y} | G |

In this example, the stations of the transfer pattern QYGLMKR that have an associated transfer pattern suffix are R, K, M, L, and G. Each transfer pattern suffix describes the sequence of two stations in the filtered transfer pattern that are used to arrive at the station associated with the suffix. For example, for station R, the sequence of stations M and K describes the order of the stations that preceded station R in the filtered transfer pattern. For each other station in the table, the corresponding transfer pattern suffix describes sequence of the two stations that precede the station associated with the transfer pattern suffix. The collective transfer pattern suffixes are the transfer pattern suffix set for source station Q and target station R.

At query time, the transfer pattern can be reconstructed from the transfer pattern suffix set recursively. This process will be described in further detail below. Although the transfer pattern themselves are lost, the amount of storage space is significantly reduced.

III. Query Time Processing

Figure 12:
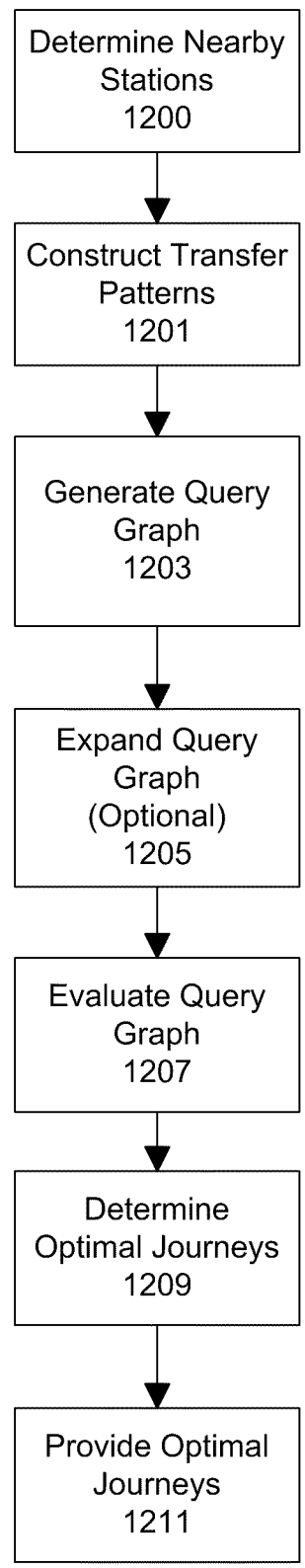
FIG. 12 is a process flow diagram of the stages performed at query time for fulfilling a user query according to one embodiment.

Referring back to FIG. 1, as previously mentioned the query resolution module 115 uses the transfer pattern computations provided by the pre-computation module 103 to determine optimal journey routes in response to user queries. By using the transfer patterns determined during pre-computation, the query resolution module 115 performs the minimal amount of computations necessary to fulfill a request. As shown in FIG. 1, the query resolution module 115 comprises a local station determination module 117, a query graph generation module 119, a query graph analysis module 121, a trip serving module 123, and a transfer pattern construction module. Referring now to FIG. 12, in one embodiment the process of processing a query of the query resolution module 115 comprises the following functional stages:

1200: Determine Nearby Stations
    1201: Construct Transfer Patterns
    1203: Generate Query Graph
    1205: Expand Query Graph
    1207: Evaluate Query Graph
    1209: Determine Optimal Journeys
    1211: Provide Optimal Journeys Each functional stage of processing a query will be further described below.

1. Determine Nearby Stations

Figure 13:
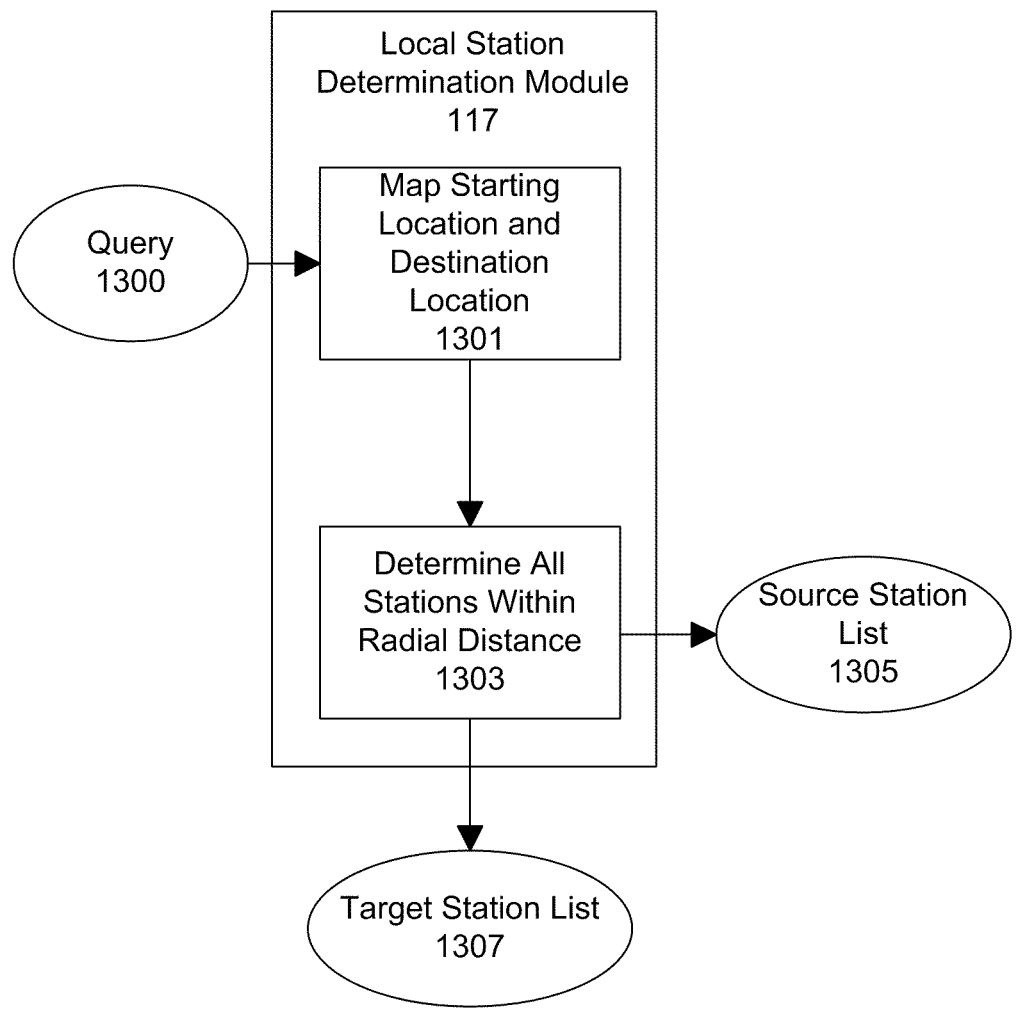
FIG. 13 is a process flow diagram for determining nearby stations to a source location and a destination location according to one embodiment.

FIG. 13 illustrates a process flow for the first stage of processing a query by determining 1200 nearby stations related to a source (i.e., starting) location and a target location as performed by the local station determination (LSD) module 117 according to one embodiment. In one embodiment, the local station determination (LSD) module 117 receives as input a query 1300. The query 1300 is received from a user for public transit directions. In one embodiment, the received query 1300 includes at least a source location and a target location for a journey. A source location is the current geographic location of the user or any location that the user may want to start the trip while the target location is the geographic location of the destination. The source and target locations may or may not be locations of transit stations. In one embodiment, the source and target location may be in the form of an address. The received query may also include a time and/or date of departure from the source location or arrival at the target location. For example, a query might state "I want a route from 801 California Street, Mountain View, Calif. 94041 at 2 pm to 555 California Street, San Francisco, Calif. 94104."

Once the query 1300 is received, the LSD module 117 maps 1301 both the source location and the target location into latitude and longitude coordinates corresponding to each location. The LSD module 117 then determines 1303 (i.e., locates) all stations within a radial distance from the latitude and longitude coordinates of the source and target locations. In one embodiment, the radial distance is set to two miles such that all stations that are within a two mile radius of the source and target location are determined. Different radial distances can be used in other embodiments.

After locating the nearby stations, the LSD module 117 generates a source station list 1305 of station IDs comprising all stations nearby the source location and generates a target station list 1307 comprising station IDs of all stations nearby the target location. Additionally, the walking cost from the source location to each of its associated nearby stations is also provided in the source station list. Similarly, the walking cost from each nearby station to the target location is also provided in the target station list.

2. Transfer Pattern Construction

In the second stage of query time processing, the transfer pattern construction module 135 constructs 1203 transfer patterns. The following discussion of transfer pattern construction is based on presumption that the transfer patterns have been computed using global stations. In one embodiment, to construct the transfer patterns, the transfer pattern construction module 135 receives as input the source station list 1303 and the target station list OO106 as input. The transfer pattern construction module 135 determines transfer patterns from the source stations in the source station list OO104 to the target stations in the target station list OO106. The determination of the transfer patterns depends upon whether a source station is a global or local station.

In one embodiment for each global station in the source station list 1303, the transfer pattern construction module 135 determines (i.e., retrieves) from the stored global transfer patterns, the global transfer patterns that describe a transfer pattern from the global station to each station in the target station list OO106. As an example, consider a source station A that is considered a global station and consider a target station L which can be either a global or local station. The transfer pattern construction module 135 determines from the stored global transfer patterns the global transfer patterns starting at station A and ending at station L resulting in one or more global transfer patterns from station A to station L. This process is repeated for each global station in the source station list 1303 to each station in the target station list OO106.

In one embodiment, for each local station in the source station list 1303, the transfer pattern construction module 135 determines a set of access stations associated with each local station. As mentioned above, an access station is a global station that is associated with a local station. Once each local station's set of access stations is determined, for each local station the transfer pattern construction module 135 determines the local transfer patterns from the local station to each of its access stations. The transfer pattern construction module 135 then determines the global transfer patterns from each access station to each target station in the target station list OO106. Thus, the transfer pattern from a local station to a target station is a combination of a local transfer pattern and a global transfer pattern.

However, note that if the optional transfer pattern compression was performed, the transfer patterns themselves are not stored. Thus, the transfer pattern construction module 135 decompresses the transfer patterns to build a full transfer pattern for the journey. In other words, the transfer pattern construction module 135 recursively builds the global transfer patterns and local transfer patterns using the transfer pattern suffix set associated with the source station and target station. As previously mentioned, the transfer pattern suffix set describes the set of suffixes associated with a pair of stations. Each suffix in the set describes a sequence of two stations that represent transit vehicle transfers at two stations prior to reaching the station associated with the transfer pattern suffix.

For example, given a source station A and a target station F, to determine the transfer pattern for the pair, the transfer pattern construction module 135 determines the set of suffixes from A to F. Consider the scenario where one of the suffixes associated with station F is (D, E). This indicates that there exists some transfer pattern from A to F ending as A, . . . , D, E, F.

To build the next leg of the transfer pattern, the transfer pattern construction module 135 determines the transfer pattern suffix set associated with the two stations listed in the previous transfer pattern suffix. The transfer pattern suffixes are then concatenated resulting in a subset of the transfer pattern. The transfer pattern construction module 135 repeats the retrieval of transfer pattern suffix sets until the transfer pattern from the source location to the target station is constructed.

Continuing the example shown above describing a transfer pattern from A to F ending as A, . . . D, E, F, the transfer pattern construction module 135 then retrieves the set of suffixes for the pair (A, E) that ends at D. In this scenario, the transfer pattern construction module 135 may retrieve suffixes (C, D) or (B, D) for station D. The transfer pattern construction module 135 then retrieves the suffixes for pair (A, D) that end at C and the suffixes for pair (A, D) that end in B. This may result in suffixes (A, C) and (B, C) being retrieved. The transfer pattern construction module 135 then determines the suffixes for pair (B, D) that end in B which may result in suffix (A, B) and the suffixes for pair (B, C) that end in B which result in suffix (A, B). The transfer pattern construction module 135 then concatenates the transfer pattern suffixes to form transfer patterns from source station A to target station F. In the example described above, the set of transfer patterns from A to F are (A, B, D, E, F), (A, B, C, D, E, F), and (A, C, D, E, F).

3. Query Graph Generation

In the third stage of processing a query, the query graph generation (QGG) module 119 generates 1205 a query graph. Generally, a query graph includes only transit information related to the query and is time independent. The query graph is used to determine the optimal route from the source location to the target location. The query graph minimizes the computation needed to determine an optimal route since the information included in the query graph is only related to the query. In one embodiment, the query graph includes the source location and the target location related to the query, nodes representing stations, and arcs connecting the stations. The stations in the query graph represent transit stations that are included in paths to reach the target location from the source location where transit vehicle transfers occur. Each arc in the query graph represents a direct connection between the pair of stations connecting the nodes. Thus, the arc may represent one or more intermediate stations where stops (but no transfers) are made along the path to reach the target station connected by the arc. Additionally, an arc may represent walking from a station where a vehicle is departed to a station where a vehicle is boarded.

Figure 14:
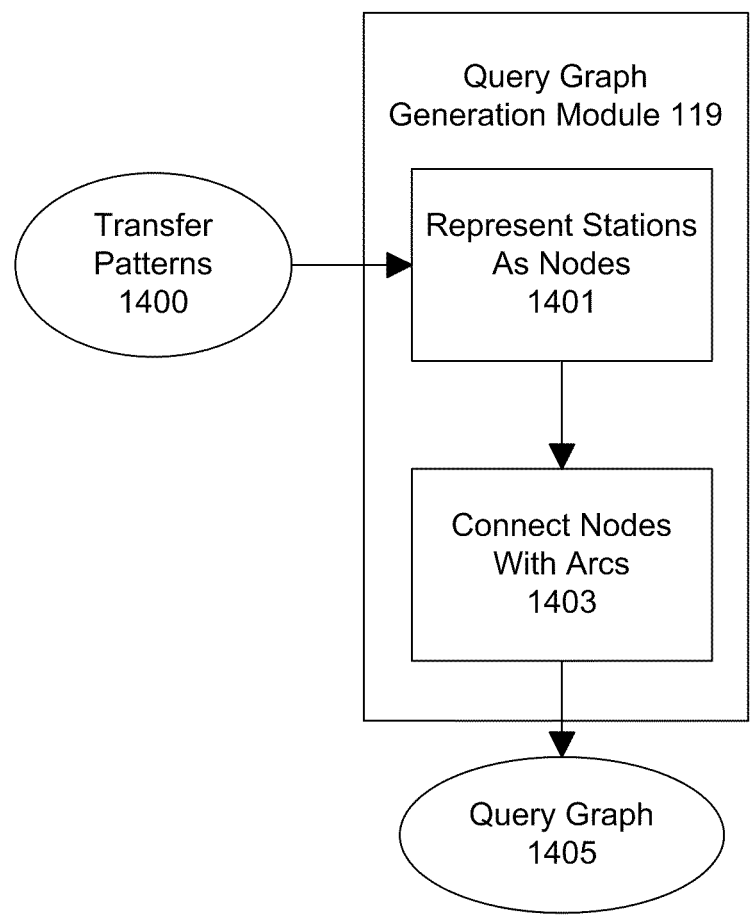
FIG. 14 is a process flow diagram for generating a query graph according to one embodiment.

Referring now to FIG. 14, a process flow of the QGG module 119 is shown for generating a query graph related to a received query. The QGG module 119 takes as input the transfer patterns 1400 associated with the source location and destination location as determined by the transfer pattern construction module 135.

Once the set of transfer patterns for each station pair (i.e., source station and target station) is received, the QGG module 119 constructs 1403 the query graph using the set of transfer patterns for each station pair. The QGG module 119 constructs the query graph by representing 1401 each station pair's set of transfer patterns as a series of nodes. That is, each station indicated in a transfer pattern is represented as a node in the query graph where the nodes are sequenced in the order indicated by the transfer pattern. The QGG module 119 then connects 1403 each pair of stations according to the sequence indicated in the transfer pattern with an arc. The arcs represent the direction of travel in the query graph and connect pairs of nodes in the query graph. In one embodiment, each arc represents either walking to a station or travelling to a station while on a transit vehicle. The representation of each arc may be provided in the query graph depending on whether the repetitive sequences in transfer patterns were filtered out during transfer pattern compression. In the context of this discussion, the transfer patterns have been filtered of repetitive sequences.

In one embodiment, the QGG module 119 assigns each node's node ID in the query graph as the station ID from the transit graph except for two artificial nodes that represent the source location and the target location. The QGG module 119 gives these nodes a generic ID such as "1" for the starting location and "2" for the destination location according to one embodiment. The QGG module 119 connects the nodes representing the source location and target station to other nodes in the query graph by arcs that represent walking Once the QGG module 119 has finished assigning an identification to each node, the query graph 1405 is completed.

Figure 15:
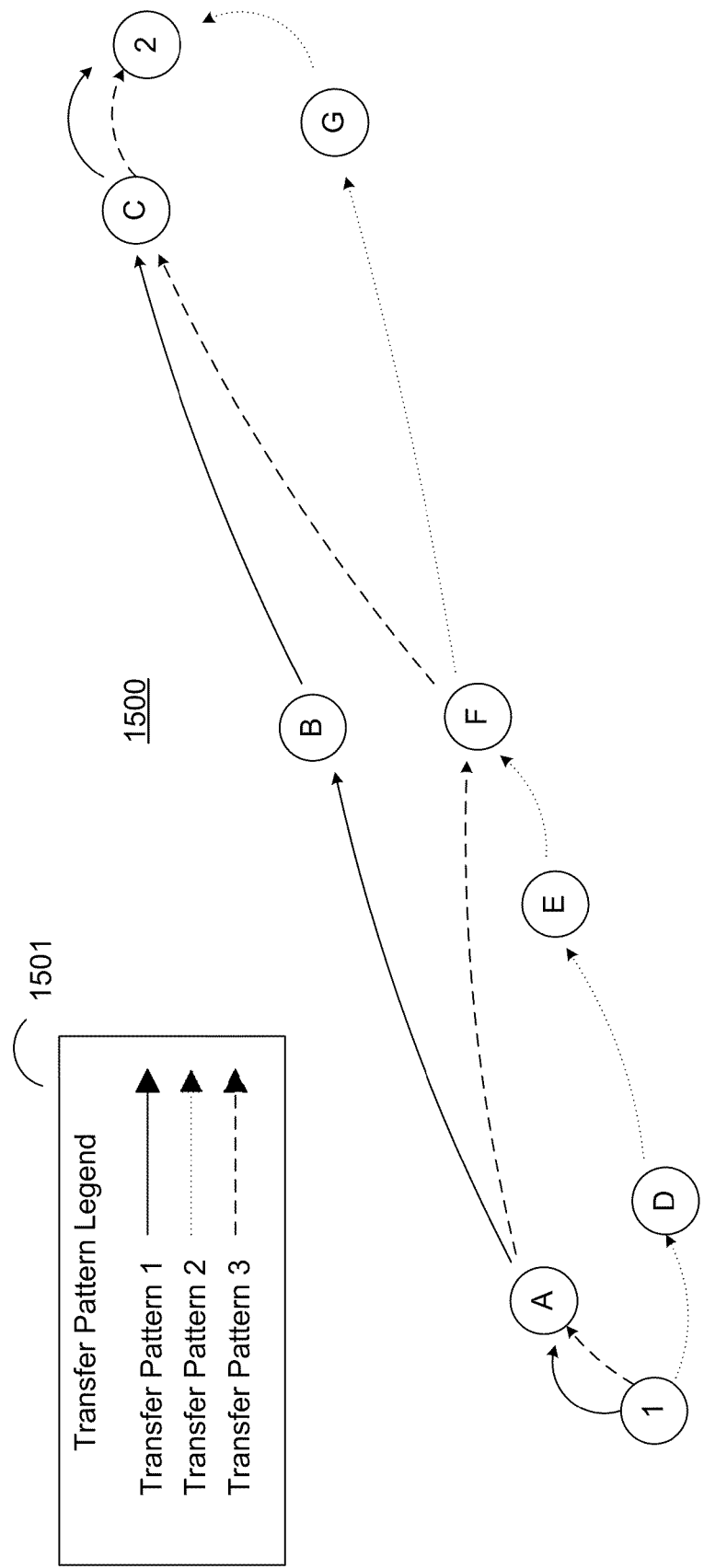
FIG. 15 illustrates an example of a query graph according to one embodiment.

Referring now to FIG. 15, there is shown one example of a query graph 1500 from a source location represented by the node labeled "1" the target location represented by the node labeled "2." Although only three transfer patterns from the source location to the target station are shown, it should be understood that the query graph can have any number of transfer patterns.

In this example, each journey is designated by the transfer pattern legend 1501. As shown in the transfer pattern legend 1501, transfer pattern 1 is associated with solid arcs, transfer pattern 2 is associated with dotted arcs and transfer pattern 3 is associated with dashed arcs. The query graph 1500 illustrates that transfer pattern 1 has a transfer pattern of {1ABC2}. Thus, the transfer pattern represents walking from the source location to station A, transit (i.e., either using a transit vehicle or walking) from station A to station B, transit from station B to station C, and walking from station C to the target location. Transfer pattern 2 on the other hand has a transfer pattern of {1DEFG2}. Thus for transfer pattern 2, the query graph 1500 indicates walking from the starting location to station D, transit from D to station E, transit E to station F, transit from station F to station G, and walking from station G to the target station. Transfer pattern 3 has a pattern of {1AFC2} and can be described in a similar manner as trips 1 and 2. As previously mentioned, the form of transit associated with each arc is not represented by the query graph and the query graph does not describe whether a transfer occurs at a station in the query graph.

4. Query Graph Expansion

Note that the fourth stage of the processing a query is optional depending on whether the optional step of transfer pattern compression is performed and the transfer patterns are filtered of their repetitive sequences of stations during the transfer pattern compression. However, as mentioned above, the context of the discussion assumes that transfer patterns have been filtered. In the fourth stage of processing a query, the query graph analysis (QGA) module 121 expands 1205 the query graph generated by the QGG module 119. As previously mentioned, the query graph includes only nodes representing stations and arcs connecting the nodes. The query graph in its unexpanded form does not describe whether an arc describes transit via walking or a transit vehicle. By expanding the query graph, the QGA module 121 can determine possible routes between each station in a transfer pattern that describe whether transfers are made and the arrival/departure time made at each station since each route is an instantiation of a transfer pattern at a specific time.

Figure 16:
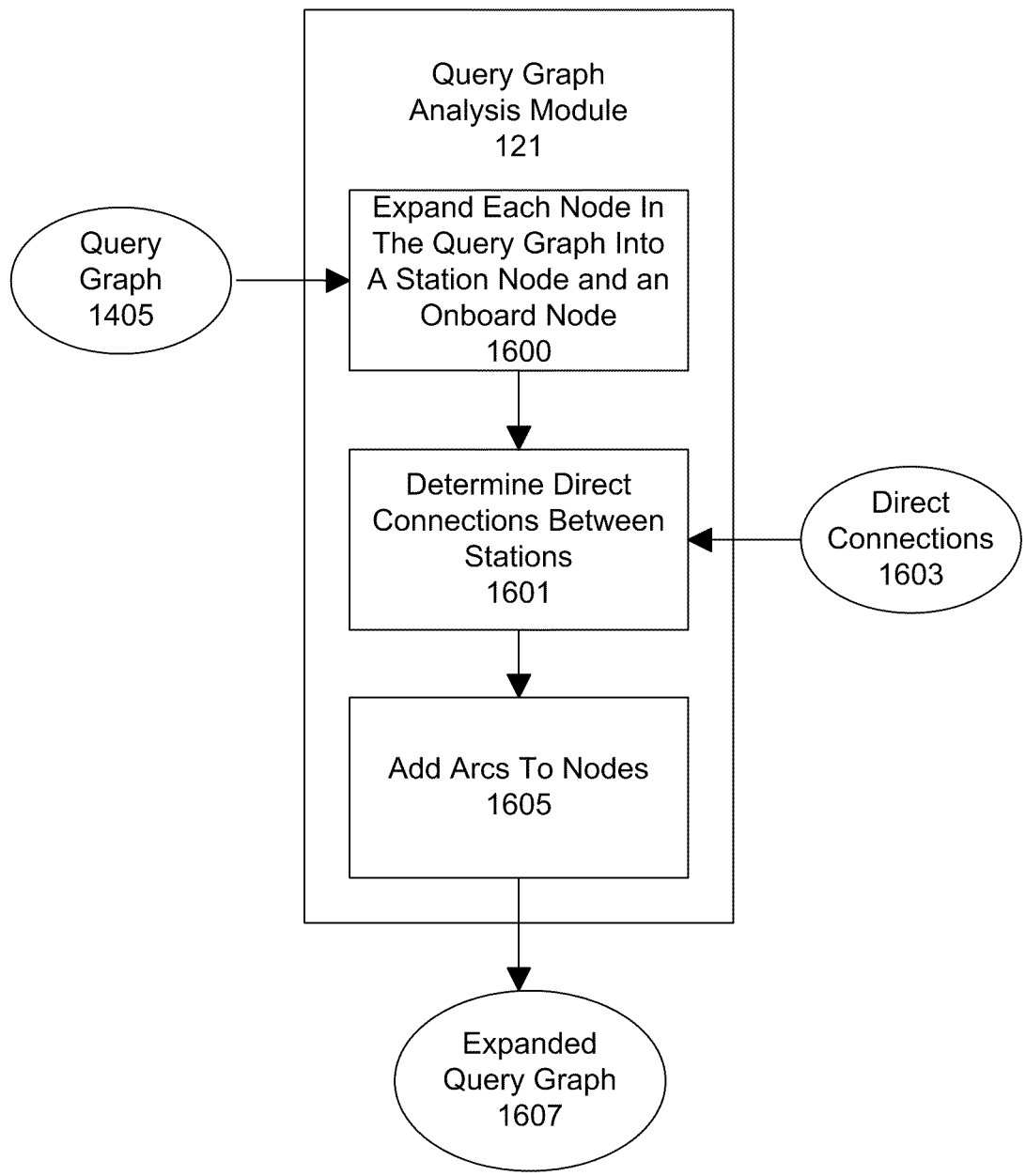
FIG. 16 is a process flow diagram for expanding a query graph according to one embodiment.

Referring now to FIG. 16, there is shown a process flow of the QGA module 121 for expanding the query graph. The QGA module 121 takes as input the query graph 1405 generated by the QGG module 119. The QGA module 121 expands 1600 each node in the query graph, except for the source location and the target location, into a station node and an onboard node. Thus, each node in the query graph now is represented by two nodes in the expanded query graph.

Now, consider the embodiment where transfer patterns are not filtered of repetitive sequences of stations in transfer patterns during transfer pattern computation. In this embodiment, the construction of the query graph will result in an expanded query graph because the transfer patterns are indicative of whether a transfer has occurred at a station. For example, in the transfer pattern of ABBCDF, this transfer pattern indicates that a person has arrived at station B and departed a transit vehicle at station B and has boarded another transit vehicle at station B. Thus, in this embodiment the query graph is generated with a station node and onboard node for station B. The query graph is essentially constructed in its expanded form. Thus, in this embodiment the teachings described above with respect to expanding a query graph are included during query graph generation.

5. Query Graph Evaluation

Once each node has been expanded, the QGA module 121 evaluates 1207 the expanded query graph. In one embodiment, the QGA module 121 determines 1601 direct connections between stations in the expanded query graph using the direct connections 1603 information stored in the direct connection database 125. That is, for each transfer pattern in the query graph, the QGA module 125 determines from the stored direct connection information if there is a direct connection from the source station to the next subsequent station, from the subsequent station to its next subsequent station and so on until the target station. In one embodiment, since the received query includes a time of departure, the QGA module 125 only determines direct connections that depart at a time greater than or equal to the indicated time. If the received query includes a time of arrival at the destination location, the QGA module 125 determines direct connections that arrive at the target station less than or equal to the time of arrival. Thus, the QGA module 125 only retrieves direct connections that are relevant to the query.

Generally, the QGA module 125 may determine one or more direct connections from between each pair of stations in a transfer pattern. Each direct connection may represent a different trip between the pair of stations. For example, the trips may be differentiated from one another due to different transit vehicles being used in each direct connection trip. Thus, the direct connections may include trips between the pair of stations that have the same exact arrival/departure times at each station in the trip, but are different due to the fact that different transit vehicles are used for each trip. Additionally, the direct connection trips may be differentiated based on schedule information associated with the trips. For example, a single transit vehicle may make multiple direct connection trips between a pair of stations and the direct connection trips may specify the schedule of each trip.

For example, consider the transfer pattern ABC. To determine the direction connections associated with the stations in the transfer pattern, the QGA module 125 retrieves (i.e., fetches) the direction connections from station A to station B. The QGA module 125 then retrieves the direct connections from B to C that depart B after the arrival at station B from station A. Note that a direct connection between a station may inherently indicate stations where the transit vehicle associated with the trip makes stops prior to reaching the station where a transfer takes place. For example, from station A to station B, the direct connection between these stations may include stops at stations E and F.

Once the direct connection trips are retrieved, the QGA module 125 stitches the direct connections in order to create the journey from the source station to the target station. Stitching (i.e., concatenating) one or more direct connections comprises merging the direct connections in order to cover the journey from the source station to the target station.

For example, consider again the transfer pattern ABC. The QGA module 125 would determine direct connection trips from station A to station B and from station B to station C at a departure time after the arrival at station B. Assume that the direct connection trip from A to B arrives at B at 1:00. In order to stitch the trips together, the QGA module 125 determines a direct connection trip that leaves station B for station C at some time after 1:00 to allow enough time for the user to transfer to the vehicle at station B that is travelling to station C.

Once the direct connections between stations has been determined, the QGA module 125 adds 1605 arcs to the nodes in the expanded query graph to represent the trips of the transfer patterns formed by one or more direct connections. In one embodiment, the expanded query graph has four types of arcs similar to the discussion of the transit graph and uses the same notation discussed above to describe transit events that occur between stations.

In one embodiment, the source location and target location are respectively connected to the station node of the source station and the onboard node of the target station to represent walking to the station. For all other stations, the QGA module 125 adds arcs between nodes in the scheme described above based on the trips determined via the direct connection queries. To represent a transfer occurring at each station in the expanded query graph, for a pair of stations, the QGA module 125 adds an arc between the source station's onboard node and the station node of the station in which the transfer occurs. For example, in the transfer pattern ABC, consider the pair AB that describes a person boarding a vehicle at station A and travelling to station B where the person leaves the vehicle at station B to board another vehicle at station B. In this example, the onboard node at station A would be connected to the station node at station B to signify a transfer occurs.

Note that the direct connection information used to create the trips has schedule information describing arrival/or departure times at stations. Thus, the arcs in the expanded query graph inherently are associated with the scheduling information. For example, if two arcs exist between station node A and onboard node B, the first arc may represent departing station A at 8:00 and arriving at station B at 12:00 whereas the second arc may represent departing station A at 10:00 and arrive at station B at 11:00. The arcs may also indicate arrivals/departures at stations where stops are made during the direct connection trip.

Figure 17:
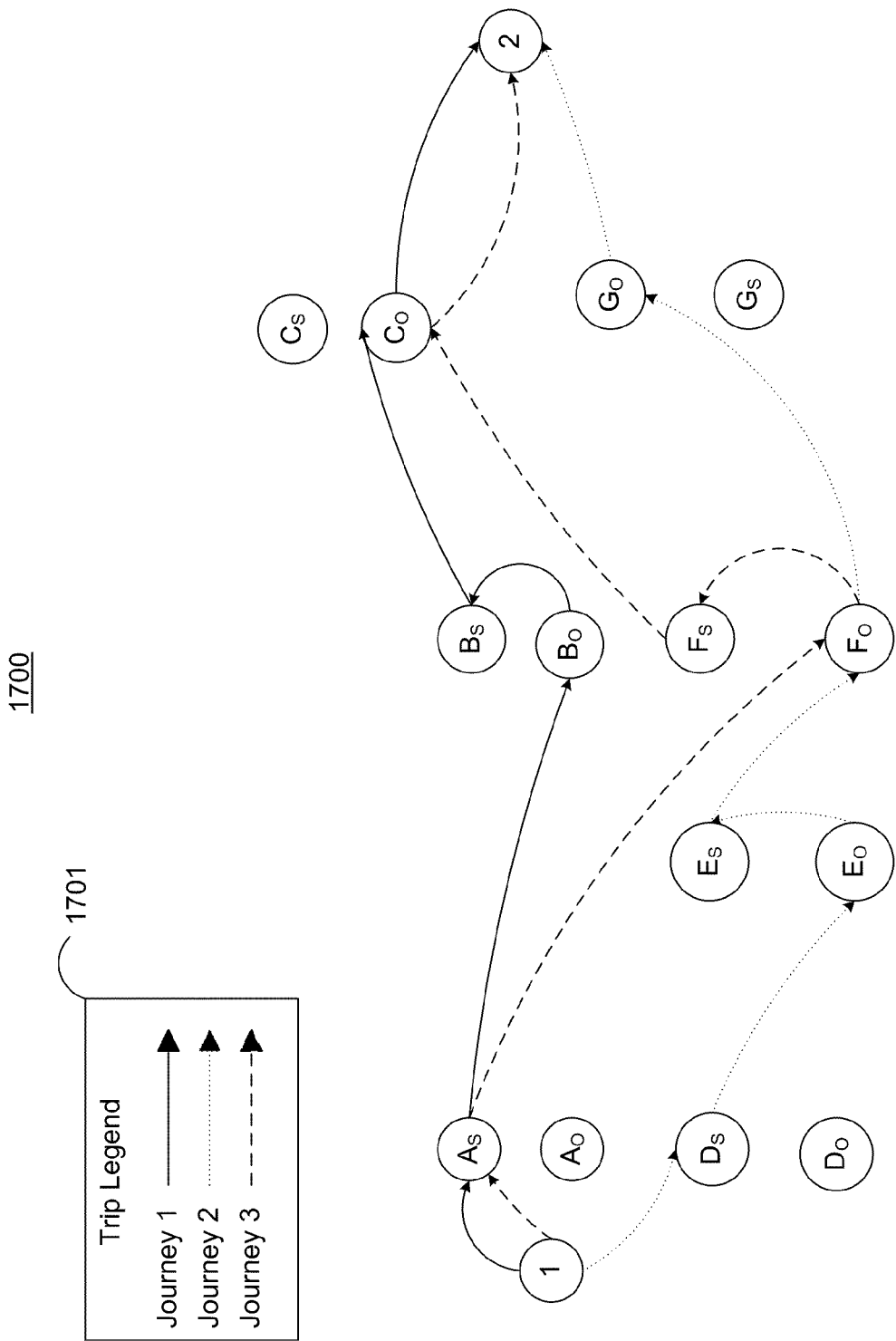
FIG. 17 illustrates an example of an expanded query graph according to one embodiment.

Referring now to FIG. 17, an example of an expanded query graph 1700 is shown of the query graph 1500 shown in FIG. 15. Note that the trip legend 1701 illustrates three trips: Journey 1, Journey 2, and Journey 3. Journey 1 is represented by the path of solid arcs and corresponds to transfer pattern 1 from the query graph 1500. Journeys 2 and 3 respectively correspond to transfer patterns 2 and 3 from the query graph 1500.

As shown in the query graph 1700, journeys 1, 2 and 3 illustrate transfers occurring at stations based on the description of the meaning of arcs connecting the different types of nodes. Specifically, journeys 1 and 3 illustrate the occurrence of a single transfer whereas journey 2 illustrates the occurrence of two transfers. Using journey 1 for example, the expanded query graph illustrates a person walking from the starting location "1" and walking to the station A and boarding a transit vehicle at station A. The transit vehicle travels to station B where the user leaves the transit vehicle and enters a second transit vehicle at station B which represents the occurrence of the transfer. From station B, the second transit vehicle travels to station C where the user departs the second transit vehicle and walks to the destination. For journey 3, the expanded query graph illustrates a transfer occurring at station E and at station F signified by the arcs connecting an onboard node to a station node at both stations E and F.

Note that for each transfer pattern in the query graph 1500, the QGA module 125 would find one or more journeys from the source station to the target station. In the expanded query graph 1700, for ease of discussion, only a single journey is shown for each transfer pattern. However, it should be understood that the sequence of stations for each transfer pattern can have more than a single trip between the stations representing different trips from the source station to the target station. For example, the stations associated with trip 1 may have three sets of different arcs that connect between the transfer pattern of $1A_SB_OB_SC_O2$ where each arc set represents a different trip.

6. Determination of Optimal Trips

Figure 18:
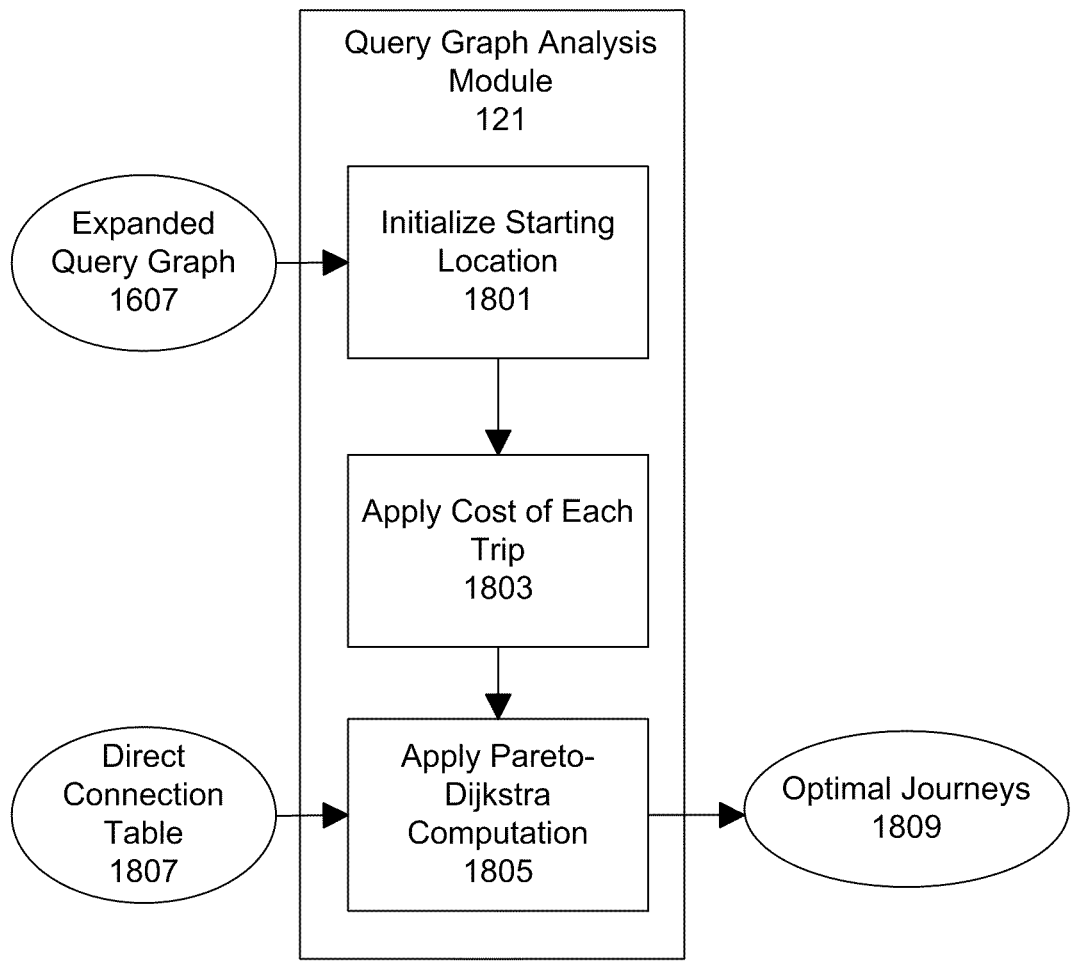
FIG. 18 is a process flow diagram for determining optimal trips from the expanded query graph according to one embodiment.

Referring now to FIG. 18, there is shown a process flow performed by the QGA module 121 to determine 1209 optimal journeys. In one embodiment, the QGA module 121 determines optimal journeys using the expanded query graph 1607. The QGA module 121 begins by initializing 1801 the starting location of the query graph. By initializing the starting location, the QGA module 121 sets a zero cost to the starting location. For each arc in the expanded query graph, the QGA module applies 1803 a cost. A cost is applied to the arc that represents walking from the source location to the source station and a cost is also applied to the arc representing walking from the target station to the target location. Costs are then applied to the remaining arcs in the expanded query graph.

The QGA module 121 then applies 1805 a Pareto-Dijkstra computation to determine optimal journeys in the expanded query graph based on the costs of the trips as specified by the direct connection table 1807. In one embodiment, the result of the Pareto-Dijkstra computation returns a plurality of optimal journeys 1809 that are considered diverse. The QGA module 121 determines a plurality of low costs journeys that differ in that they go along geographically different paths meaning that the transfer pattern of the journeys are different. In another embodiment, the QGA module 121 determines journeys with vehicle diversity. That is, the QGA module 121 determines an optimal journey that is made via bus, an optimal journey by subway, and an optimal journey by tram. Lastly, the QGA module 121 may determine optimal journeys that have temporal diversity in that the journeys are similar in route, but the journeys occur (i.e., arrive and/or depart) at different times. For example, two journeys with the same route may have the same cost but depart at times that are fifteen minutes apart.

In an alternative embodiment, rather than applying a Pareto-Dijkstra computation to determine the optimal journeys, the QGA module 121 may explore the expanded query graph using other techniques. In one embodiment, the QGA module 121 uses a single criterion graph search computation such as Dijkstra's algorithm. Since Dijkstra's algorithm uses only a single criterion to evaluate the query graph whereas the application of a Pareto-Dijkstra evaluates the query graph in terms of multiple criteria, the application of Dijkstra's algorithm to the query graph results in a faster determination of the optimal journeys. However, using Dijkstra's algorithm to evaluate the query graph results in a set of optimal journeys that are less diverse than the set of optimal journeys resulting from the application of the Pareto-Dijkstra computation due to the evaluation of the query graph using only a single criteria such as time or vehicle transfers for example.

In another embodiment, the QGA module 121 may also use other techniques to accelerate the evaluation of the query graph to determine the optimal journeys. For example, the QGA module 121 can apply goal-direct searches, known to those skilled in the art as the A* search algorithm, or other heuristics to improve the speed of determining the optimal journeys and/or the diversity of the results depending on the requirements of the system.

6. Provide Optimal Journeys

In the last stage for processing a query, the trip serving module 123 provides 1211 the optimal journeys to the user. In one embodiment, the trip serving module 123 formats the optimal journeys for display on a result page. Referring now to FIG. 19, there is shown one example of a result page 1900. The query input section 1901 illustrates text boxes where the source location and target location is entered. The suggested routes section 1903 illustrates the optimal journeys determined by the transit server 100. As seen in the suggested routes 1903, the transit server 100 provided three optimal journeys that have similar duration of transit, but depart from different times. The journey information section 1905 illustrates the route of the journey. In the example shown, the route for journey 1 is shown. The directions indicate to walk from the starting location to the Caltrain station. Although not shown, by pressing the show details button 1907, directions are given on how to reach the Caltrain station from the starting location. Then from the Caltrain station, the directions indicate to board train 233 that departs the Mountain View Caltrain station at 8:59 am and arrives at the San Francisco Caltrain station at 10:02 am. From here, Bus 10 is taken from Townsend St & 4$^{th}$ St at 10:09 am and arrives at Sansome St. & California St at 10:20 am. The user then walks to the destination location at 555 California St.

IV. Conclusion

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be understood that the process steps, instructions, of the present invention as described and claimed, are executed by computer hardware operating under program control, and not mental steps performed by a human. Similarly, all of the types of data described and claimed are stored in a computer readable storage medium operated by a computer system, and are not simply disembodied abstract ideas.

The present invention also relates to an apparatus for performing the operations herein. This apparatus may be specially constructed for the required purposes, or it may comprise a general-purpose computer selectively activated or reconfigured by a computer program stored on a computer readable medium that can be executed by the computer. Such a computer program are stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein can be executed by any type or brand computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

We claim:

1. A computer-implemented method for determining a public transit route of a journey from a starting location to a target location, the public transit route using at least one public transportation system having public transportation vehicles, the method executed by a computer and comprising:

storing in a first database transfer patterns for the at least one public transportation system, each stored transfer pattern describing a route between a pair of transit stations associated with the at least one public transportation system and comprising at least one transfer between the public transportation vehicles at transit stations located between the pair of transit stations;

storing in a second database, information describing public transit stations, including for each public transit station a location;

receiving from a client device a request for a public transit route from the starting location to the target location, the public transit route to include directions from the starting location to the target location using the at least one public transportation system;

determining using the second database the transit stations of the at least one public transportation system that has locations within a radial distance of the starting location thereby generating a source station list that comprises the transit stations within the radial distance of the starting location;

determining using the second database transit stations of the at least one public transportation system that has locations within the radial distance of the target location thereby generating a target station list that comprises the transit stations within the radial distance of the target location;

for each pair wise combination of transit stations that includes one source station from the source station list and one target station from the target station list, retrieving from the first database of stored transfer patterns a stored transfer pattern that describes transfers of public transportation vehicles of the at least one public transportation system at intermediate transit stations between the source station and the target station in the pair wise combination in order to travel from the source station to the target station;

for each retrieved transfer pattern, determining at least one optimal public transit route from the source station to the target station that is an instantiation of the transfer pattern at a specific time; and transmitting information describing the at least one optimal public transit route to the client device.

2. The method of claim 1, wherein the starting location is a current geographic location of a user of the client device.

3. The method of claim 1, wherein the target location is the geographic location of a destination desired by the user of the client device.

4. The method of claim 1, wherein the starting location or the target location is a geographic location of a transit station.

5. The method of claim 1, wherein the request further comprises a time of departure from the starting location or a time of arrival at the target location.

6. The method of claim 1, wherein retrieving from the first database of stored transfer patterns the stored transfer pattern comprises:

retrieving one or more transfer suffixes that describe a sequenced pair of stations that precede a station associated with each transfer pattern suffix; and concatenating the one or more suffixes to generate the at least one stored transfer pattern.

7. The method of claim 1, further comprising:

generating a query graph by representing the stored transfer pattern of each pair wise combination of transit stations of the at least one public transportation system as a sequence of nodes connected by arcs in an order described by the stored transfer pattern.

8. The method of claim 7, wherein determining at least one optimal public transit route from the source station to the target station that is an instantiation of the transfer pattern at a specific time comprises:

expanding the query graph by representing each node in the query graph as a station node that represents a public transportation vehicle of the at least one public transportation system being boarded at a transit station associated with the station node and an onboard node that represents a public transportation vehicle of the at least one public transportation system that remains boarded during an arrival of a transit vehicle at a transit station associated with the onboard node;

determining one or more direct connection routes from the source station to each subsequent station, wherein a direct connection route describes a route from the source station to a subsequent station and a schedule of stops at intermediate transit stations between the source station and the subsequent that are associated with the at least one stored transfer pattern; and for each of the one or more direct connection routes, connecting a series of nodes in the expanded query graph with arcs to represent the direct connection route, each node in the series representing a station associated the at least one stored transfer pattern.

9. The method of claim 8, further comprising:

determining one or more direct connections from the source station to at least one subsequent station;

determining one or more direct connections from the at least one subsequent station to the target station; and concatenating the one or more direct connections from the source station to the at least one subsequent station with the one or more direct connections from the at least one subsequent station to the target station in order to form a route from the source station to the target station; and connecting a series of nodes in the expanded query graph with arcs to represent the formed route.

10. The method of claim 8, wherein determining at least one optimal public transit route from the source station to the target station that is an instantiation of the transfer pattern at a specific time comprises:

calculating the at least one optimal route by applying a Pareto-Dijkstra computation to the expanded query graph to determine the at least one optimal route from the source station to the target station based upon multi-dimensions of cost, wherein the multi-dimensions of cost comprise of time duration between a pair of stations and a penalty.

11. The method of claim 10 wherein the penalty is based at least in part on monetary cost, number of public transportation vehicle transfers required to reach the target station from the source station, and walking costs.

12. The method of claim 8, wherein determining at least one optimal public transit route from the source station to the target station that is an instantiation of the transfer pattern at a specific time comprises:

calculating the at least one optimal route by applying a Dijkstra computation to the expanded query graph to determine the at least one optimal route from the source station to the target station based upon a single dimension of cost, wherein the single dimension of cost comprises one of total time to complete the trip from the source station to the target station, transfers required to reach the target station from the source station, or monetary cost.

13. The method of claim 8, wherein determining at least one optimal public transit route from the source station to the target station that is an instantiation of the transfer pattern at a specific time comprises applying a goal-directed search to determine the at least one optimal route, wherein the goal-directed search is an A* search algorithm.

14. A computer-program product comprising a non-transitory computer-readable storage medium storing computer-executable code for determining a public transit route of a journey from a starting location to a target location, the public transit route using at least one public transportation system having public transportation vehicles, the code when executed by a computer processor performs the steps of
storing in a first database transfer patterns for the at least one public transportation system, each stored transfer pattern describing a route between a pair of transit stations associated with the at least one public transportation system and comprising at least one transfer between the public transportation vehicles at transit stations located between the pair of transit stations;
storing in a second database, information describing public transit stations, including for each public transit station a location;
receiving from a client device a request for a public transit route from the starting location to the target location, the public transit route to include directions from the starting location to the target location using the at least one public transportation system;
determining using the second database the transit stations of the at least one public transportation system that has locations within a radial distance of the starting location thereby generating a source station list that comprises the transit stations within the radial distance of the starting location;
determining using the second database transit stations of the at least one public transportation system that has locations within the radial distance of the target location thereby generating a target station list that comprises the transit stations within the radial distance of the target location;
for each pair wise combination of transit stations that includes one a source station from the source station list and one target station from the target station list, retrieving from the first database of stored transfer patterns a stored transfer pattern that describes transfers of public transportation vehicles of the at least one public transportation system at intermediate transit stations between the source station and the target station in the pair wise combination in order to travel from the source station to the target station;
for each retrieved transfer pattern, determining at least one optimal public transit route from the source station to the target station that is an instantiation of the transfer pattern at a specific time; and
transmitting information describing the at least one optimal public transit route to the client device.

15. The computer program product of claim 14, wherein retrieving from the first database of stored transfer patterns the stored transfer pattern comprises:
retrieving one or more transfer suffixes that describe a sequenced pair of stations that precede a station associated with each transfer pattern suffix; and
concatenating the one or more suffixes to generate the at least one stored transfer pattern.

16. The computer program product of claim 14, wherein the computer-readable storage medium further comprises computer-executable code that when executed by the processor:
generates a query graph by representing the stored transfer pattern of each pair wise combination of transit stations of the at least one public transportation system as a sequence of nodes connected by arcs in an order described by the at least one stored transfer pattern.

17. The computer program product of claim 16, wherein determining at least one optimal public transit route from the source station to the target station that is an instantiation of the transfer pattern at a specific time comprises:
expanding the query graph by representing each node in the query graph as a station node that represents a public transportation vehicle of the at least one public transportation system being boarded at a transit station associated with the station node and an onboard node that represents a public transportation vehicle of the at least one public transportation system that remains boarded during an arrival of a transit vehicle at a transit station associated with the onboard node;
determining one or more direct connection routes from the source station to each subsequent station, wherein a direct connection route describes a route from the source station to a subsequent station and a schedule of stops at intermediate transit stations between the source station and the subsequent that are associated with the at least one stored transfer pattern; and
for each of the one or more direct connection routes, connecting a series of nodes in the expanded query graph with arcs to represent the direct connection route, each node in the series representing a station associated the at least one stored transfer pattern.

18. The computer program product of claim 14, wherein the computer-readable storage medium further comprises computer-executable code that when executed by the processor:
determines one or more direct connections from the source station to at least one subsequent station;
determines one or more direct connections from the at least one subsequent station to the target station; and
concatenates the one or more direct connections from the source station to the at least one subsequent station with the one or more direct connections from the at least one subsequent station to the target station in order to form a route from the source station to the target station; and
connects a series of nodes in the expanded query graph with arcs to represent the formed route.

19. The computer program product of claim 14, wherein determining at least one optimal public transit route from the source station to the target station that is an instantiation of the transfer pattern at a specific time comprises:
calculating the at least one optimal route by applying a Pareto-Dijkstra computation to the expanded query graph to determine the at least one optimal route from the source station to the target station based upon multi-dimensions of cost, wherein the multi-dimensions of cost comprise of time duration between a pair of stations and a penalty.

20. A computer-system for determining a public transit route of a journey from a starting location to a target location, the public transit route using at least one public transportation system having public transportation vehicles, the method executed by a computer and comprising:

a computer processor; and a computer-readable storage medium storing computer executable code configured to execute on the computer processor, the code when executed performs steps comprising:

storing in a first database transfer patterns for the at least one public transportation system, each stored transfer pattern describing a route between a pair of transit stations associated with the at least one public transportation system and comprising at least one transfer between the public transportation vehicles at transit stations located between the pair of transit stations;

storing in a second database, information describing public transit stations, including for each public transit station a location;

receiving from a client device a request for a public transit route from the starting location to the target location, the public transit route to include directions from the starting location to the target location using the at least one public transportation system;

determining using the second database the transit stations of the at least one public transportation system that has locations within a radial distance of the starting location thereby generating a source station list that comprises the transit stations within the radial distance of the starting location;

determining using the second database transit stations of the at least one public transportation system that has locations within the radial distance of the target location thereby generating a target station list that comprises the transit stations within the radial distance of the target location;

for each pair wise combination of transit stations that includes one source station from the source station list and one target station from the target station list, retrieving from the first database of stored transfer patterns a stored transfer pattern that describes transfers of public transportation vehicles of the at least one public transportation system at intermediate transit stations between the source station and the target station in the pair wise combination in order to travel from the source station to the target station;

for each retrieved transfer pattern, determining at least one optimal public transit route from the source station to the target station that is an instantiation of the transfer pattern at a specific time; and transmitting information describing the at least one optimal public transit route to the client device.

21. The computer system of claim 20, wherein the starting location is a current geographic location of a user of the client device.

22. The computer system of claim 20, wherein the target location is the geographic location of a destination desired by the user of the client device.

23. The computer system of claim 20, wherein the starting location or the target location is a geographic location of a transit station.

24. The computer system of claim 20, wherein the request further comprises a time of departure from the starting location or a time of arrival at the target location.

25. The computer system of claim 20, wherein retrieving from the first database of stored transfer patterns the stored transfer pattern comprises:

retrieving one or more transfer suffixes that describe a sequenced pair of stations that precede a station associated with each transfer pattern suffix; and concatenating the one or more suffixes to generate the at least one stored transfer pattern.

26. The computer system of claim 20, wherein the code when executed performs further steps comprising:

generating a query graph by representing the stored transfer pattern of each pair wise combination of transit stations of the at least one public transportation system as a sequence of nodes connected by arcs in an order described by the stored transfer pattern.

27. The computer system of claim 26, wherein determining at least one optimal public transit route from the source station to the target station that is an instantiation of the transfer pattern at a specific time comprises:

expanding the query graph by representing each node in the query graph as a station node that represents a public transportation vehicle of the at least one public transportation system being boarded at a transit station associated with the station node and an onboard node that represents a public transportation vehicle of the at least one public transportation system that remains boarded during an arrival of a transit vehicle at a transit station associated with the onboard node;

determining one or more direct connection routes from the source station to each subsequent station, wherein a direct connection route describes a route from the source station to a subsequent station and a schedule of stops at intermediate transit stations between the source station and the subsequent that are associated with the at least one stored transfer pattern; and for each of the one or more direct connection routes, connecting a series of nodes in the expanded query graph with arcs to represent the direct connection route, each node in the series representing a station associated the at least one stored transfer pattern.

28. The computer system of claim 27, wherein the code when executed performs further steps comprising:

determining one or more direct connections from the source station to at least one subsequent station;

determining one or more direct connections from the at least one subsequent station to the target station; and concatenating the one or more direct connections from the source station to the at least one subsequent station with the one or more direct connections from the at least one subsequent station to the target station in order to form a route from the source station to the target station; and connecting a series of nodes in the expanded query graph with arcs to represent the formed route.

29. The computer system of claim 27, wherein determining at least one optimal public transit route from the source station to the target station that is an instantiation of the transfer pattern at a specific time comprises:

calculating the at least one optimal route by applying a Pareto-Dijkstra computation to the expanded query graph to determine the at least one optimal route from the source station to the target station based upon multi-dimensions of cost, wherein the multi-dimensions of cost comprise of time duration between a pair of stations and a penalty.

30. The computer system of claim 29, wherein the penalty is based at least in part on monetary cost, number of public transportation vehicle transfers required to reach the target station from the source station, and walking costs.

31. The computer system of claim 27, wherein determining at least one optimal public transit route from the source station to the target station that is an instantiation of the transfer pattern at a specific time comprises:

calculating the at least one optimal route by applying a Dijkstra computation to the expanded query graph to determine the at least one optimal route from the source station to the target station based upon a single dimension of cost, wherein the single dimension of cost comprises one of total time to complete the trip from the source station to the target station, transfers required to reach the target station from the source station, or monetary cost.

32. The computer system of claim 27, wherein determining at least one optimal public transit route from the source station to the target station that is an instantiation of the transfer pattern at a specific time comprises applying a goal-directed search to determine the at least one optimal route, wherein the goal-directed search is an A* search algorithm.

* * * * *